United States Patent
Furuta et al.

(10) Patent No.: US 11,149,171 B2
(45) Date of Patent: Oct. 19, 2021

(54) THERMALLY-CONDUCTIVE PRESSURE-SENSITIVE ADHESIVE SHEET

(71) Applicant: NITTO DENKO CORPORATION, Ibaraki (JP)

(72) Inventors: Kenji Furuta, Ibaraki (JP); Yoshio Terada, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 464 days.

(21) Appl. No.: 14/892,243

(22) PCT Filed: May 29, 2014

(86) PCT No.: PCT/JP2014/064316
§ 371 (c)(1),
(2) Date: Nov. 19, 2015

(87) PCT Pub. No.: WO2014/192886
PCT Pub. Date: Dec. 4, 2014

(65) Prior Publication Data
US 2016/0152872 A1    Jun. 2, 2016

(30) Foreign Application Priority Data

Jun. 1, 2013 (JP) .............................. JP2013-116542
Feb. 5, 2014 (JP) .............................. JP2014-020794
May 9, 2014 (JP) .............................. JP2014-097977

(51) Int. Cl.
*C09J 11/04* (2006.01)
*C09J 7/38* (2018.01)
(Continued)

(52) U.S. Cl.
CPC ................. *C09J 11/04* (2013.01); *C09J 7/38* (2018.01); *C09J 9/00* (2013.01); *C09J 133/08* (2013.01);
(Continued)

(58) Field of Classification Search
CPC .. C09J 7/02; C09J 2201/122; C09J 2201/602; C09J 2201/606; C09J 11/04; C09J 7/38;
(Continued)

(56) References Cited

U.S. PATENT DOCUMENTS 3,925,282 A * 12/1975 Davis ................... C09J 133/062
                                                          524/272
4,071,652 A * 1/1978 Brullo ..................... C09J 7/0271
                                                          174/73.1
(Continued)

FOREIGN PATENT DOCUMENTS

CN           1738882 A      2/2006
EP         2 532 723 A1    12/2012
(Continued)

OTHER PUBLICATIONS

International Search Report for PCT/JP2014/064316 dated Aug. 5, 2014.
(Continued)

*Primary Examiner* — Scott R. Walshon
(74) *Attorney, Agent, or Firm* — Sughrue Mion, PLLC

(57) ABSTRACT

A thermally-conductive pressure-sensitive adhesive sheet including a pressure-sensitive adhesive layer containing thermally-conductive particles. One side of the sheet is an adhesive face, and the other side is a non-adhesive face. The thermally-conductive pressure-sensitive adhesive sheet may include a non-adhesive layer on or over only one side of the pressure-sensitive adhesive layer. In this case, the ratio of the thickness of the non-adhesive layer to the thickness of the pressure-sensitive adhesive layer is preferably 0.04 to 0.6. The thermally-conductive pressure sensitive adhesive sheet preferably has a thermal resistance of 6 K·cm²/W or less. The thermally-conductive pressure sensitive adhesive sheet preferably has a total thickness of 50 to 500 μm.

17 Claims, 1 Drawing Sheet

(51) Int. Cl.
*C08K 3/22* (2006.01)
*C09J 9/00* (2006.01)
*C09J 133/08* (2006.01)
*C09K 5/14* (2006.01)

(52) U.S. Cl.
CPC ........ *C08K 3/22* (2013.01); *C08K 2003/2227* (2013.01); *C09J 2301/122* (2020.08); *C09J 2301/302* (2020.08); *C09J 2301/314* (2020.08); *C09J 2301/408* (2020.08); *C09J 2433/00* (2013.01); *C09K 5/14* (2013.01)

(58) Field of Classification Search
CPC ........... C09J 7/20–7/29; C09J 2301/314; C09J 2301/408; C09J 2301/122; C09J 2301/302; C09J 2205/106
See application file for complete search history.

(56) References Cited

U.S. PATENT DOCUMENTS

| | | | | |
|---|---|---|---|---|
| 5,609,954 | A * | 3/1997 | Aizawa | C09J 201/00 428/317.5 |
| 6,071,630 | A * | 6/2000 | Tomaru | B23Q 3/154 279/128 |
| 6,123,799 | A * | 9/2000 | Ohura | C09J 9/00 156/332 |
| 6,355,344 | B1 * | 3/2002 | Mamish | C09J 7/245 428/343 |
| 6,432,497 | B2 * | 8/2002 | Bunyan | H01L 23/36 257/712 |
| 9,061,478 | B2 * | 6/2015 | Choi | B32B 5/022 |
| 2002/0129848 | A1 * | 9/2002 | Miura | B32B 17/10788 136/251 |
| 2003/0049472 | A1 * | 3/2003 | Murschall | B32B 27/36 428/480 |
| 2005/0030823 | A1 * | 2/2005 | Tsuyuno | H01L 23/4951 365/232 |
| 2005/0124731 | A1 * | 6/2005 | Blumenschein | C09J 11/04 523/220 |
| 2006/0134406 | A1 * | 6/2006 | Horigome | C09J 7/0296 428/343 |
| 2007/0072999 | A1 * | 3/2007 | Carfagnini | C08L 23/10 525/191 |
| 2010/0233926 | A1 * | 9/2010 | Shin | C09J 9/00 442/149 |
| 2012/0295052 | A1 * | 11/2012 | Choi | B32B 5/022 428/40.9 |
| 2012/0301716 | A1 | 11/2012 | Terada et al. | |
| 2012/0309879 | A1 * | 12/2012 | Furuta | C08K 3/38 524/315 |
| 2013/0041093 | A1 | 2/2013 | Nakayama et al. | |
| 2013/0078406 | A1 * | 3/2013 | Shouji | H01L 24/27 428/41.7 |
| 2014/0004342 | A1 | 1/2014 | Tojo et al. | |
| 2014/0037924 | A1 | 2/2014 | Furula et al. | |

FOREIGN PATENT DOCUMENTS

| | | | | |
|---|---|---|---|---|
| EP | 2 674 464 | A1 | 12/2013 | |
| EP | 2 698 406 | A1 | 2/2014 | |
| JP | 2004-27039 | A | 1/2004 | |
| JP | 2007-332293 | A | 12/2007 | |
| JP | 2011-099791 | A | 5/2011 | |
| JP | 2011-162582 | A | 8/2011 | |
| JP | 2011-241329 | A | 12/2011 | |
| JP | 2012-180495 | A | 9/2012 | |
| JP | 2012-229392 | A | 11/2012 | |
| WO | WO-2011099369 | A1 * | 8/2011 | ............ C09J 133/08 |
| WO | WO-2011145523 | A1 * | 11/2011 | ............ C09J 133/00 |
| WO | 2012/140955 | A1 | 10/2012 | |

OTHER PUBLICATIONS

First Office Action dated Mar. 30, 2017 from the State Intellectual Property Office of the P.R.C. in counterpart Application No. 201480031062.7.
Notification of Reasons for Rejection dated Mar. 6, 2018, from Japanese Patent Office in counterpart application No. 2014-097977.
The Second Office Action dated Dec. 12, 2017, from the State Intellectual Property Office of People's Republic of China in counterpart Application No. 201480031062.7.
Rejection Decision dated Jun. 15, 2018 issued by the State Intellectual Property Office of People's Republic of China in counterpart application No. 201480031062.7
Notification of Reasons for Rejection dated May 22, 2018, from the Japanese Patent Office in counterpart application No. 2014-097977.

* cited by examiner

[Fig. 1]
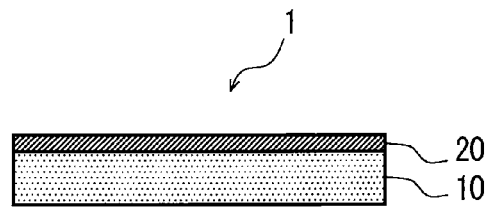
[Fig. 2]
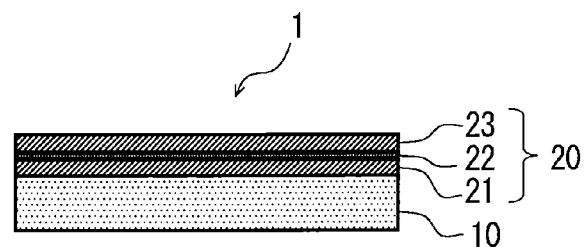
[Fig. 3(a)]
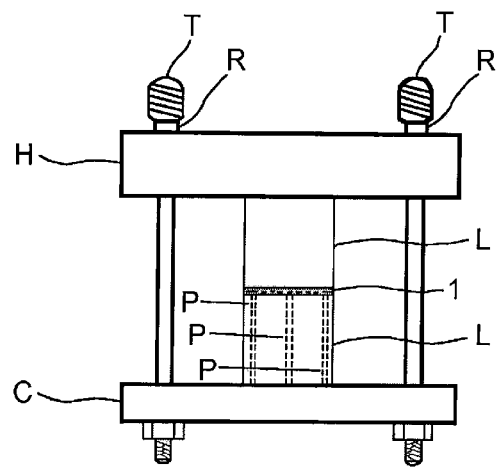
[Fig. 3(b)]
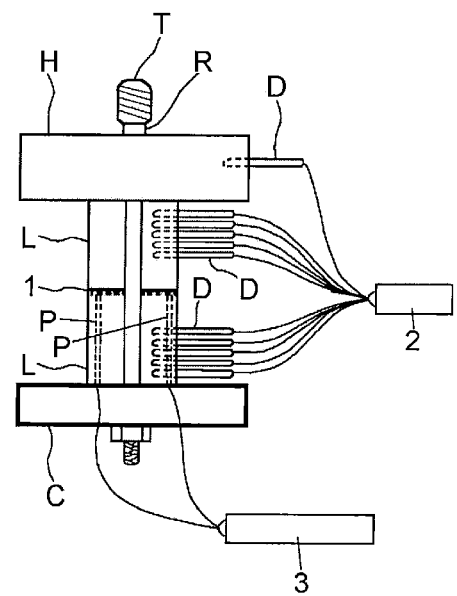

THERMALLY-CONDUCTIVE PRESSURE-SENSITIVE ADHESIVE SHEET

CROSS REFERENCE TO RELATED APPLICATIONS

This application is a National Stage of International Application No. PCT/JP2014/064316 filed May 29, 2014, claiming priority based on Japanese Patent Application Nos. 2013-116542 filed Jun. 1, 2013, 2014-020794 filed Feb. 5, 2014, and 2014-097977 filed May 9, 2014, the contents of all of which are incorporated herein by reference in their entirety.

TECHNICAL FIELD

The present invention relates to thermally-conductive pressure-sensitive adhesive sheets. More specifically, the present invention relates to a thermally-conductive pressure-sensitive adhesive sheet that is thermally coupled to members at both sides of the sheet, but is not physically bonded or joined to one of the members.

BACKGROUND ART

With increasing integration and increasing performance of electronic appliances, thermally-conductive members or components (e.g., pressure-sensitive adhesive sheets) for use in the electronic appliances increasingly require high thermal conductivity. An exemplary known pressure-sensitive adhesive sheet having thermal conductivity is a double-sided pressure-sensitive adhesive sheet that includes a pressure-sensitive adhesive layer further containing particles (e.g., aluminum hydroxide and alumina) (see Patent Literature (PTL) 1).

CITATION LIST

Patent Literature

PTL 1: Japanese Unexamined Patent Application Publication (JP-A) No. 2004-27039

SUMMARY OF INVENTION

Technical Problem

Although having good thermal conductivity, the double-sided pressure-sensitive adhesive sheet adhesively secure adherends (e.g., members and/or parts typically of electrical/electronic appliances) at both sides of the pressure-sensitive adhesive sheet. Disadvantageously, this configuration impedes free detachment of the members and/or parts. In particular, the double-sided pressure-sensitive adhesive sheet, when being a substrate-less double-sided (transfer) pressure-sensitive adhesive sheet, has low self-supporting ability. Unfortunately, this causes the pressure-sensitive adhesive sheet to readily become wrinkled upon application to the adherends and to have poor surface smoothness.

Accordingly, the present invention has an object to provide a thermally-conductive pressure-sensitive adhesive sheet as follows. This thermally-conductive pressure-sensitive adhesive sheet can thermally couple members and/or parts (these are hereinafter also referred to as "member(s) or any other component(s)") at both sides of the sheet to each other and exhibit excellent thermal conductivity. In addition, the thermally-conductive pressure-sensitive adhesive sheet can adhesively secure an adherend (e.g., a member or any other component) at one side, but neither adheres to nor secures a member or any other component at the other side. This allows the member or any other component at the other side to be moved or detached as need arises.

The present invention has another object to provide a thermally-conductive pressure-sensitive adhesive sheet that has the properties and still resists wrinkling upon application to the adherend.

In addition, the present invention has yet another object to provide a thermally-conductive pressure-sensitive adhesive sheet as follows. This thermally-conductive pressure-sensitive adhesive sheet has the properties and still has a smooth surface. This configuration may allow smooth operation of moving and/or removing of a member or part in contact with one side of the sheet.

Solution to Problem

After intensive investigations to achieve the objects, the inventors of the present invention have found a thermally-conductive pressure-sensitive adhesive sheet including a pressure-sensitive adhesive layer containing thermally-conductive particles, in which one side of the sheet is an adhesive face, and the other side is a non-adhesive face. The inventors have also found that this thermally-conductive pressure-sensitive adhesive sheet can thermally couple members or any other components at both sides of the sheet to each other and exhibits excellent thermal conductivity. The inventors have further found that the thermally-conductive pressure-sensitive adhesive sheet can adhere to and secure one of the members or any other components at the one side, but does not physically secure the other of the members or any other components at the other side, and this configuration allows the member or any other component at the other side to be moved and/or detached as need arises. The present invention has been made based on these findings.

Specifically, the present invention provides a thermally-conductive pressure-sensitive adhesive sheet including a pressure-sensitive adhesive layer containing thermally-conductive particles. One side of the sheet is an adhesive face, and the other side is a non-adhesive face.

In an embodiment, the thermally-conductive pressure-sensitive adhesive sheet may include a non-adhesive layer on or over only one side of the pressure-sensitive adhesive layer. In this embodiment, the ratio of the thickness of the non-adhesive layer to the thickness of the pressure-sensitive adhesive layer is preferably 0.04 to 0.6.

The thermally-conductive pressure-sensitive adhesive sheet preferably has a thermal resistance of equal to or less than 6 K·cm$^2$/W.

The thermally-conductive pressure-sensitive adhesive sheet preferably has a total thickness of 50 to 500 μm.

The thermally-conductive pressure-sensitive adhesive sheet preferably has an initial elastic modulus of 0.5 to 2000 MPa.

The non-adhesive face in the thermally-conductive pressure-sensitive adhesive sheet preferably has an arithmetic mean surface roughness Ra of 0.001 to 1.0 μm.

The non-adhesive face is preferably black.

The thermally-conductive pressure-sensitive adhesive sheet is usable for or in thin electrical/electronic appliances.

Advantageous Effects of Invention

The thermally-conductive pressure-sensitive adhesive sheet according to the present invention includes a pressure-sensitive adhesive layer containing thermally-conductive particles, in which one side of the sheet is an adhesive face, and the other side is a non-adhesive face. This configuration allows the thermally-conductive pressure sensitive adhesive sheet to thermally couple members or any other components at both sides of the sheet to each other and to exhibit excellent thermal conductivity. For example, the thermally-conductive pressure sensitive adhesive sheet conducts heat of an adherend at the adhesive face to a member at the non-adhesive face. In addition, the thermally-conductive pressure sensitive adhesive sheet adheres to and secures the adherend (such as a member) at the adhesive face, but does not adhere-to/secure a member or any other component at the non-adhesive face, and this allows the member or any other component at the non-adhesive face to be moved and/or detached as need arises. The pressure sensitive adhesive sheet has the non-adhesive face as one side (surface) of the sheet. This configuration allows the pressure-sensitive adhesive sheet to resist wrinkling upon application to the adherend. In addition, the pressure-sensitive adhesive sheet can have a smooth surface as the non-adhesive face. This allows the member or any other component in contact with the non-adhesive face to be moved and/or detached smoothly. The pressure-sensitive adhesive sheet still resists misalignment with respect to the adherend and resists wrinkling even when the member or any other component is moved.

BRIEF DESCRIPTION OF DRAWINGS

FIG. 1 is a schematic cross-sectional view illustrating a thermally-conductive pressure-sensitive adhesive sheet according to an embodiment of the present invention;

FIG. 2 is a schematic cross-sectional view illustrating a thermally-conductive pressure-sensitive adhesive sheet according to another embodiment of the present invention; and FIGS. 3(a) and (b) are schematic illustrations of a thermal characterization system.

DESCRIPTION OF EMBODIMENTS

The thermally-conductive pressure-sensitive adhesive sheet according to the present invention is a thermally-conductive pressure sensitive adhesive sheet that includes a pressure-sensitive adhesive layer containing thermally-conductive particles. One side of the thermally-conductive pressure sensitive adhesive sheet is an adhesive face, and the other side constitutes a non-adhesive face.

The term "pressure-sensitive adhesive sheet" in the description also refers to and includes a "pressure-sensitive adhesive tape". A composition (e.g., a coating composition) for use to form a pressure-sensitive adhesive layer is also referred to as a "pressure-sensitive adhesive composition" in the description. The term "non-adhesive layer" does not include release liners (separators) which will be removed upon use of the thermally-conductive pressure-sensitive adhesive sheet.

In the thermally-conductive pressure-sensitive adhesive sheet according to the present invention, one of the both sides of the sheet is an adhesive face, and the other side is a non-adhesive face. A non-limiting example of the thermally-conductive pressure-sensitive adhesive sheet as mentioned above is a pressure-sensitive adhesive sheet that further includes a non-adhesive layer disposed on or over only one side of the pressure-sensitive adhesive layer containing thermally-conductive particles. A non-limiting example of the non-adhesive layer is a substrate.

FIG. 1 is a schematic cross-sectional view illustrating a thermally-conductive pressure-sensitive adhesive sheet according to an embodiment of the present invention. FIG. 2 is a schematic cross-sectional view illustrating a thermally-conductive pressure-sensitive adhesive sheet according to another embodiment of the present invention. FIGS. 1 and 2 illustrate a thermally-conductive pressure-sensitive adhesive sheet 1, a pressure-sensitive adhesive layer (thermally-conductive pressure-sensitive adhesive layer) 10, and a non-adhesive layer (substrate) 20. FIG. 2 further illustrates plastic films 21 and 23, and a metallic foil 22.

Non-Adhesive Layer

A non-limiting example of the non-adhesive layer is a substrate (base). Examples of the substrate include, but are not limited to, fibrous substrates such as cloths, nonwoven fabrics, felt, and nets; paper-based substrates such as a variety of paper; metallic substrates including foils and sheets of metals such as aluminum, gold, silver, copper, zinc, nickel, and alloys; plastic substrates that are in the form typically of film or sheet and made from various resins; foams such as foam sheets (expanded sheets); graphite; laminates including any of them. Among them, preferred are substrates each including a plastic film. These substrates are preferred from the points of strength, toughness, and electrical insulating properties. The substrate may be a single-layer substrate or a multilayer substrate.

Examples of materials to constitute the plastic substrates include, but are not limited to, polyesters such as poly(ethylene terephthalate)s, poly(ethylene naphthalate)s, poly(butylene terephthalate)s, and poly(butylene naphthalate)s; polyolefins such as polyethylenes, polypropylenes, and ethylene-propylene copolymers; poly(vinyl alcohol)s; poly(vinylidene chloride)s; poly(vinyl chloride)s; vinyl chloride-vinyl acetate copolymers; poly(vinyl acetate)s; polyamides; polyimides; celluloses; fluorocarbon resins; polyethers; polyetheramides; poly(ether ether ketone)s; poly(phenylene sulfide)s; polystyrene resins such as polystyrenes; polycarbonates; and polyethersulfones. Each of different materials may be used alone or in combination.

Among them, preferred as the material to constitute the plastic substrate are poly(ethylene terephthalate)s (PETs) and other polyesters and polyimides, of which poly(ethylene terephthalate)s are more preferred. These are preferred for good balance among strength, handleability, cost, dimensional stability, and anchoring force. Specifically, the substrate is preferably a polyester film or a polyimide film and is more preferably a poly(ethylene terephthalate) film.

Of the substrates each including a plastic film, examples of multilayer substrates include, but are not limited to, laminates each including two or more plastic films; and laminates each including a plastic film and a metallic foil. Among them, preferred are laminates each having the layer configuration of [plastic film/metallic foil]; and laminates each having the layer configuration of [plastic film/metallic foil/plastic film]. These are preferred from the points typically of thermal conductivity. The plastic films for use in these laminates are preferably poly(ethylene terephthalate) films and other polyester films, and polyimide films, of which poly(ethylene terephthalate) films are more preferred. These are preferred for the reasons as above. The metallic foils for use in the laminates are typically preferably aluminum foils and copper foils from the points typically of thermal conductivity.

The substrate may have undergone a surface treatment as needed. Examples of such surface treatment include, but are not limited to, common surface treatments so as to offer better adhesion to the pressure-sensitive adhesive layer, such as chromate treatment, exposure to ozone, exposure to flame, exposure to a high-voltage electric shock, treatment with ionizing radiation, and other oxidation treatments by chemical or physical techniques; primer treatments so as to offer better adhesion to the pressure-sensitive adhesive layer; hard coating treatments so as to allow the surface to have better scratch resistance (abrasion resistance); and release treatments to the substrate backside in an embodiment where the pressure-sensitive adhesive sheet is wound into a roll so as to protect the adhesive face.

In the present invention, the thermally-conductive pressure-sensitive adhesive sheet may be subjected to a measure (treatment) so as to allow the thermally-conductive pressure sensitive adhesive sheet to obtain thermal radiation ability or to have better thermal radiation ability. Assume that the thermally-conductive pressure-sensitive adhesive sheet is allowed to obtain thermal radiation ability or to have better thermal radiation ability; and that the thermally-conductive pressure sensitive adhesive sheet is used typically in an electrical/electronic appliance. In this case, the thermally-conductive pressure sensitive adhesive sheet can efficiently radiate (diffuse) heat generated from an electronic component to the entire interior of the electrical appliance and/or to space that surrounds the appliance. This configuration can restrain or prevent performance deterioration and any other disadvantages of the electrical/electronic appliance, where the disadvantages may be caused by heat. Examples of techniques for allowing he thermally-conductive pressure-sensitive adhesive sheet to obtain thermal radiation ability or to have better thermal radiation ability include, but are not limited to, techniques (i) and (ii) below. In the technique (i), the non-adhesive face (outermost surface of the non-adhesive layer) is allowed to have a dark color (dark tone). In the technique (ii), a thermally radiating layer is disposed as the outermost layer of the non-adhesive layer.

In the technique (i), the non-adhesive face (outermost surface of the non-adhesive layer) preferably has a color selected from black, dark gray, brown, red, dark red, dark green, dark blue, deep blue (navy blue), and deep purple, of which black is particularly preferred. For example, assume that the color (material color) of the non-adhesive face (outermost surface of the non-adhesive layer) is indicated according to the CIE 1976 (L*, a*, b*) color space. In this case, the non-adhesive face may have a lightness L* of preferably equal to or less than 35 (from 0 to 35) and more preferably equal to or less than 30 (from 0 to 30) and may have a* and b* both in the range of preferably −30 to 30, more preferably in the range of −20 to 20, furthermore preferably in the range of −10 to 10, and particularly preferably in the range of −5 to 5. The L*, a*, and b* specified by the L*a*b* color space may be measured typically using a colorimeter (device name CR-200, supplied by Konica Minolta). The L*a*b* color space was standardized by International Commission on Illumination in 1976 and is prescribed in Japanese Industrial Standards as JIS Z 8781-4:2013.

A non-limiting example of the technique (i) is the use, as the substrate, of a substrate that is colored or painted any of the colors. For example, the substrate for use herein is preferably a plastic film that is colored or painted any of the dark colors such as a polyester films that is colored or painted any of the dark colors and polyimide films that is colored or painted any of the dark colors. In particular, the substrate is particularly preferably a polyester film that is colored or painted black and furthermore preferably poly (ethylene terephthalate) films that is colored or painted black.

In the technique (ii), a thermally radiating material to form the thermally radiating layer has only to be a material having a high radiation factor (e.g., 0.6 to 1, preferably 0.7 to 1, and more preferably 0.8 to 1). Examples of the thermally radiating material include, but are not limited to, carbon materials, ceramics, tin oxide-antimony oxide semiconductors, and metals. Each of different thermally radiating materials may be used alone or in combination. The radiation factor may be measured with reference to or in conformity to the method prescribed in JIS A 1423:1983. The thermally radiating layer may be formed by stacking the layer directly on, or via another layer over, the outer surface of the substrate. More specifically, the thermally radiating layer may be provided typically by applying or printing a coating material, ink, or any other substance containing the thermally radiating material to the substrate surface; or by applying a pressure-sensitive adhesive tape or sheet to the substrate surface, where the pressure-sensitive adhesive tape or sheet includes, at the backside of a tape substrate, a coating or print layer containing the thermally radiating material. Examples of the coating material or ink containing the thermally radiating material include, but are not limited to, commercially available thermally radiating coating materials. Examples of the pressure-sensitive adhesive tape or sheet include, but are not limited to, commercially available black tapes and thermally radiating sheets. The thermally radiating layer, when provided, does not necessarily have to have a dark color.

The non-adhesive layer (e.g., the substrate) may have a thickness not critical, but the lower limit of the thickness is preferably 2 μm, more preferably 5 μm, and furthermore preferably 9 μm. The upper limit of the thickness is preferably 100 μm, more preferably 50 μm, and furthermore preferably 40 μm. The range is preferred from the points of handleability, thermal conductivity, resistance to wrinkling upon application, and smoothness.

Pressure-Sensitive Adhesive Layer

The pressure-sensitive adhesive layer in the thermally-conductive pressure-sensitive adhesive sheet exhibits adhesiveness. Such pressure-sensitive adhesive layer is derived from a pressure-sensitive adhesive composition. For example, the after-mentioned acrylic pressure-sensitive adhesive layer is derived from an acrylic pressure-sensitive adhesive composition.

Examples of the pressure-sensitive adhesive to constitute the pressure-sensitive adhesive layer include, but are not limited to, urethane pressure-sensitive adhesives, acrylic pressure-sensitive adhesive, rubber pressure-sensitive adhesives, silicone pressure-sensitive adhesives, polyester pressure-sensitive adhesives, polyamide pressure-sensitive adhesives, epoxy pressure-sensitive adhesives, vinyl alkyl ether pressure-sensitive adhesives, and fluorine-containing pressure-sensitive adhesives. Among them, acrylic pressure-sensitive adhesives are preferred because the acrylic pressure-sensitive adhesives are advantageous in weatherability, heat resistance, functions, cost, and easiness in designing of the pressure-sensitive adhesives according to an intended use. In other words, the thermally-conductive pressure-sensitive adhesive sheet according to the present invention preferably includes an acrylic pressure-sensitive adhesive layer.

The acrylic pressure-sensitive adhesive layer contains an acrylic polymer as a base polymer. The acrylic polymer is a polymer derived from a constitutional monomer component or components including an acrylic monomer. The acrylic monomer referred to a monomer containing one or more (meth)acryloyl groups in the molecule. The acrylic polymer is preferably a polymer derived from constitutional monomer component(s) including a (meth)acrylic alkyl ester. The acrylic pressure-sensitive adhesive layer may contain each of different acrylic polymers alone or in combination.

Examples of the (meth)acrylic alkyl ester include, but are not limited to, (meth)acrylic alkyl esters whose alkyl moiety contains 1 to 20 carbon atoms, such as methyl (meth) acrylate, ethyl (meth)acrylate, propyl (meth)acrylate, isopropyl (meth)acrylate, butyl (meth)acrylate, isobutyl (meth) acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth) acrylate, nonadecyl (meth)acrylate, and eicosyl (meth)acrylate. Among them, preferred are (meth)acrylic alkyl esters whose alkyl moiety contains 1 to 12 carbon atoms (in particular 2 to 12 carbon atoms), of which (meth)acrylic alkyl esters whose alkyl moiety contains 4 to 9 carbon atoms are more preferred. These (meth)acrylic alkyl esters are preferred for easy balancing of pressure-sensitive adhesive properties. The monomer component(s) may include each of different (meth)acrylic alkyl esters alone or in combination.

The proportion of the (meth)acrylic alkyl ester(s) in all monomer components (100 percent by weight) to constitute the acrylic polymer is not critical, but preferably equal to or more than 60 percent by weight (e.g., 60 to 99 percent by weight), more preferably equal to or more than 70 percent by weight (e.g., 70 to 98 percent by weight), and furthermore preferably equal to or more than 80 weight (e.g., 80 to 98 percent by weight).

The acrylic polymer may be a polymer that is derived from constitutive monomer component(s) including one or more of the (meth)acrylic alkyl esters alone. Alternatively, the acrylic polymer may be a polymer that is derived from constitutive monomer components including one or more of the (meth)acrylic alkyl esters in combination with one or more copolymerizable monomers. This configuration may be advantageous for allowing the polymer to obtain a function or functions according to necessity; and for more appropriately controlling properties of the pressure-sensitive adhesive and controlling acrylic polymer structure. The constitutive monomer components may include each of different copolymerizable monomers alone or in combination.

The copolymerizable monomers are exemplified by, but are not limited to, polar-group-containing monomers. Examples of the polar-group-containing monomers include, but are not limited to, carboxy-containing monomers, hydroxy-containing monomers, nitrogen-containing monomers, sulfonate-containing monomers, and phosphate-containing monomers. The constitutive monomer components may include each of different polar-group-containing monomers alone or in combination.

The carboxy-containing monomers are monomers each containing one or more carboxy groups per molecule, but may also be in the form of anhydrides. Examples of the carboxy-containing monomers include, but are not limited to, (meth)acrylic acid, itaconic acid, maleic acid, fumaric acid, crotonic acid, isocrotonic acid, maleic anhydride, and itaconic anhydride. Each of different carboxy-containing monomers may be used alone or in combination.

In particular, the acrylic polymer is preferably derived from constitutive monomer component(s) approximately devoid of carboxy-containing monomers. The term "approximately devoid of" carboxy-containing monomers refers to that the monomer component(s) to constitute the acrylic polymer includes no (is completely devoid of) carboxy-containing monomers, or the proportion of carboxy-containing monomers is equal to or less than 0.1 percent by weight based on the total weight (100 percent by weight) of all monomer components to constitute the acrylic polymer.

Assume that the acrylic pressure-sensitive adhesive layer contains the after-mentioned thermally-conductive particles; and further assume that the acrylic polymer is derived from constitutive monomer component(s) including a carboxy-containing monomer. In this case, it may be difficult for the acrylic pressure-sensitive adhesive layer to offer better adhesiveness due to the presence of the polar-group-containing monomer, upon the use of some thermally-conductive particles. Also in the above case, the acrylic pressure-sensitive adhesive composition, which is a composition to form the acrylic pressure-sensitive adhesive layer, may have inferior fluidity (flowability), and this may impede the formation of the pressure-sensitive adhesive layer. While their causes are not sufficiently clarified, these are probably because the carboxy group of the carboxy-containing monomer reacts with a functional group (e.g., hydroxy group) of the thermally-conductive particles, and this causes the acrylic pressure-sensitive adhesive composition to become hard more than necessary and/or may cause the pressure-sensitive adhesive layer to become hard more than necessary. Such excessive hardness may cause the pressure-sensitive adhesive layer to have lower wettability.

The acrylic polymer, when being derived from copolymerizable monomer(s) including a hydroxy-containing monomer, may allow the thermally-conductive particles to be dispersed satisfactorily and may allow the acrylic pressure-sensitive adhesive layer to have good wettability with the adherend. Examples of the hydroxy-containing monomer include, but are not limited to, 2-hydroxyethyl (meth) acrylate, 2-hydroxypropyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth) acrylate, and (4-hydroxymethylcyclohexyl)methyl methacrylate. Among them, 2-hydroxyethyl (meth)acrylate, 3-hydroxypropyl (meth)acrylate, and 4-hydroxybutyl (meth) acrylate are preferred. Each of different hydroxy-containing monomers may be used alone or in combination.

The monomer components to constitute the acrylic polymer, when including one or more nitrogen-containing monomers as the copolymerizable monomers, may impart suitable polarity to the acrylic polymer and may allow the acrylic pressure-sensitive adhesive layer to readily have good adhesive properties such as adhesiveness in early stages of the application (bonding); and bonding reliability. Examples of the nitrogen-containing monomers include, but are not limited to, N-hydroxyalkyl(meth)acrylamides such as N-(2-hydroxyethyl)(meth)acrylamide, N-(2-hydroxypropyl)(meth)acrylamide, N-(1-hydroxypropyl)(meth)acrylamide, N-(3-hydroxypropyl)(meth)acrylamide, N-(2-hydroxybutyl)(meth)acrylamide, N-(3-hydroxybutyl)(meth)acrylamide, and N-(4-hydroxybutyl)(meth)acrylamide; cyclic (meth) acrylamides such as N-(meth)acryloylmorpholine and N-acryloylpyrrolidine; and non-cyclic (meth)acrylamides such as (meth)acrylamide and N-substituted (meth)acrylamides. Examples of the N-substituted (meth)acrylamides include, but are not limited to, N-alkyl(meth)acrylamides such as N-ethyl(meth)acrylamide and N-n-butyl(meth)acrylamide; and N,N-dialkyl(meth)acrylamides such as N,N-dimethyl(meth)acrylamide, N,N-diethyl(meth)acrylamide, N,N-dipropyl(meth)acrylamide, N,N-diisopropyl(meth)acrylamide, N,N-di(n-butyl)(meth)acrylamide, and N,N-di(t-butyl)(meth)acrylamide.

Examples of the nitrogen-containing monomers further include, but are not limited to, cyclic N-vinylamides such as N-vinyl-2-pyrrolidone (NVP), N-vinyl-2-piperidone, N-vinyl-3-morpholinone, N-vinyl-2-caprolactam, N-vinyl-1,3-oxazin-2-one, and N-vinyl-3,5-morpholinedione; amino-containing monomers such as aminoethyl (meth)acrylate, N,N-dimethylaminoethyl (meth)acrylate, and N,N-dimethylaminopropyl (meth)acrylate; monomers each containing a maleimide skeleton, such as N-cyclohexylmaleimide and N-phenylmaleimide; and itaconimide monomers such as N-methylitaconimide, N-ethylitaconimide, N-butylitaconimide, N-2-ethylhexylitaconimide, N-laurylitaconimide, and N-cyclohexylitaconimide. Each of different nitrogen-containing monomers may be used alone or in combination.

Of the nitrogen-containing monomers, preferred are N-hydroxyalkyl(meth)acrylamides, N-vinyl cyclic amides, cyclic (meth)acrylamides, and N-substituted (meth)acrylamides, of which N-(2-hydroxyethyl)(meth)acrylamide, N-vinyl-2-pyrrolidone, N-(meth)acryloylmorpholine, and N,N-diethyl(meth)acrylamide are more preferred.

The proportion of the nitrogen-containing monomer(s) in all monomer components (100 percent by weight) to constitute the acrylic polymer is not critical, but the lower limit of the proportion is preferably equal to or more than 1 percent by weight, and more preferably equal to or more than 2 percent by weight. The upper limit of the proportion is preferably equal to or less than 10 percent by weight, and more preferably equal to or less than 7 percent by weight.

Examples of the sulfonate-containing monomers include, but are not limited to, styrenesulfonic acids, allylsulfonic acid, 2-(meth)acrylamido-2-methylpropanesulfonic acid, (meth)acrylamidopropanesulfonic acids, sulfopropyl (meth)acrylates, and (meth)acryloyloxynaphthalenesulfonic acids. Each of different sulfonate-containing monomers may be used alone or in combination.

A non-limiting example of the phosphate-containing monomers is 2-hydroxyethylacryloyl phosphate. Each of different phosphate-containing monomers may be used alone or in combination.

The blending proportion of the polar-group-containing monomer(s) in the monomer components to constitute the acrylic polymer is not critical, but typically preferably equal to or more than 0.1 percent by weight, more preferably equal to or more than 0.5 percent by weight, furthermore preferably equal to or more than 1 percent by weight, still more preferably equal to or more than 2 percent by weight, still furthermore preferably equal to or more than 3 percent by weight, and particularly preferably equal to or more than 5 percent by weight, based on the total weight (100 percent by weight) of all monomer components to constitute the acrylic polymer. The blending proportion of the polar-group-containing monomer(s) is not critical, but typically preferably equal to or less than 40 percent by weight, more preferably equal to or less than 30 percent by weight, furthermore preferably equal to or less than 25 percent by weights, and particularly preferably equal to or less than 20 percent by weight, based on the total weight (100 percent by weight) of all monomer components to constitute the acrylic polymer.

The blending proportion of the polar-group-containing monomer(s) in the monomer components is typically preferably, but not limitatively, 0.1 to 40 percent by weight based on the total weight (100 percent by weight) of all monomer components to constitute the acrylic polymer. The polar-group-containing monomer(s), when contained in a blending proportion within the ranges, may allow the pressure-sensitive adhesive layer to have appropriate cohesive force and to offer a high holding power and a high adhesive strength.

Examples of the copolymerizable monomers also include, but are not limited to, alkoxy-containing monomers. The acrylic polymer, when being derived from monomer components including such an alkoxy-containing monomer as the copolymerizable monomer, may allow the acrylic pressure-sensitive adhesive layer to have better wettability and may allow the thermally-conductive pressure sensitive adhesive sheet to efficiently conduct heat from the adherend (heat source). Examples of the alkoxy-containing monomers include, but are not limited to, 2-methoxyethyl (meth)acrylate, 3-methoxypropyl (meth)acrylate, methoxymethylene glycol (meth)acrylate, and methoxypolypropylene glycol (meth)acrylate. Each of different alkoxy-containing monomers may be used alone or in combination.

The proportion of the alkoxy-containing monomer(s) in all monomer components (100 percent by weight) to constitute the acrylic polymer is not critical, but the lower limit of the proportion is preferably 3 percent by weight and more preferably 5 percent by weight. The upper limit of the proportion is preferably 20 percent by weight and more preferably 15 percent by weight.

Examples of the copolymerizable monomers further include multifunctional monomers. Such multifunctional monomers can introduce a bridged structure (crosslinked structure) into the acrylic polymer. This configuration may adjust the cohesive force of the pressure-sensitive adhesive layer. Examples of the multifunctional monomers include, but are not limited to, hexanediol di(meth)acrylate, butanediol di(meth)acrylate, (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl (meth)acrylate, vinyl (meth)acrylate, divinylbenzene, epoxy acrylates, polyester acrylates, and urethane acrylates. Each of different multifunctional monomers may be used alone or in combination.

The proportion of the multifunctional monomer(s) in all monomer components (100 percent by weight) to constitute the acrylic polymer is not critical, but the lower limit of the proportion is preferably 0.01 percent by weight and more preferably 0.02 percent by weight. The upper limit of the proportion is preferably 2 percent by weight and more preferably 1 percent by weight. The multifunctional monomer(s), when used in a proportion of equal to or more than 0.01 percent by weight, may advantageously allow the acrylic polymer to have high cohesive force and to have high holding power. In contrast, the multifunctional monomer(s), when used in a proportion of equal to or less than 2 percent by weight, may advantageously restrain a trouble in which the acrylic pressure-sensitive adhesive layer has an excessively high cohesive force and has lower adhesiveness.

In addition, examples of the copolymerizable monomers further include, but are not limited to, epoxy-containing monomers such as glycidyl (meth)acrylate and allyl glycidyl ether; cyano-containing monomers such as acrylonitrile and methacrylonitrile; styrenic monomers such as styrene and α-methylstyrene; α-olefins such as ethylene, propylene, isoprene, butadiene, and isobutylene; isocyanato-containing monomers such as 2-isocyanatoethyl acrylate and 2-isocyanatoethyl methacrylate; vinyl ester monomers such as vinyl acetate and vinyl propionate; vinyl ether monomers such as vinyl ether; heterocycle-containing (meth)acrylic esters such as tetrahydrofurfuryl (meth)acrylate; halogen-containing monomers such as fluorine-containing (meth)acrylates; alkoxysilyl-containing monomers such as 3-methacryloxypropyltrimethoxysilane and vinyltrimethoxysilane; siloxane-bond-containing monomers such as silicone (meth) acrylates; (meth)acrylates each containing an alicyclic hydrocarbon group, such as cyclopentyl (meth)acrylate, cyclohexyl (meth)acrylate, bornyl (meth)acrylate, and isobornyl (meth)acrylate; and (meth)acrylates each containing an aromatic hydrocarbon group, such as phenyl (meth) acrylate, benzyl (meth)acrylate, phenoxyethyl (meth)acrylate, and phenoxydiethylene glycol (meth)acrylate.

The acrylic polymer may have a glass transition temperature (Tg) not critical, but the upper limit of the glass transition temperature (Tg) is preferably −10° C. and more preferably −20° C., and the lower limit thereof is preferably −70° C. and more preferably −65° C. The ranges are preferred for more readily giving an acrylic pressure-sensitive adhesive layer that has low elasticity and giving acrylic pressure-sensitive adhesive layer that offers good bump absorptivity (conformability to bumps). The glass transition temperature Tg of the acrylic polymer may be adjusted by selecting the composition (formulation) and/or blending amounts of constitutive monomer components. As used herein the term "glass transition temperature Tg of the acrylic polymer" refers to a value that is obtained according to the Fox equation based on the glass transition temperatures Tg of homopolymers respectively derived from monomers constituting the monomer components and based on the weight fractions (copolymerization composition) of the monomers. The glass transition temperatures Tg of such homopolymers are available from various known literature or information, such as "Handbook of Pressure Sensitive Adhesive Technology", NIKKAN KOGYO SHIMBUN, LTD.

The acrylic polymer may be obtained by polymerizing the monomer component(s). Examples of a polymerization technique include, but are not limited to, solution polymerization, emulsion polymerization, bulk polymerization, and photopolymerization (active-energy-ray-polymerization). Among them, polymerization techniques using heat and/or active energy rays are preferred, of which polymerization techniques using heat and/or active energy rays and using a polymerization initiator are more preferred. The active energy ray is exemplified by, but is not limited to, alpha rays, beta rays, gamma rays, neutron beams, electron beams, and other ionizing radiation; and ultraviolet rays. The polymerization initiator is exemplified by, but is not limited to, thermal initiators and photoinitiators. Each of different polymerization initiators may be used alone or in combination.

In particular, the polymerization technique is preferably a polymerization technique by the action of active energy rays (in particular, ultraviolet rays) using a photoinitiator. This technique is preferred typically for a shorter polymerization time. Specifically, the pressure-sensitive adhesive layer is preferably an active-energy-ray-curable pressure-sensitive adhesive layer.

Examples of the photoinitiator include, but are not limited to, benzoin ether photoinitiators, acetophenone photoinitiators, α-ketol photoinitiators, aromatic sulfonyl chloride photoinitiators, photoactive oxime photoinitiators, benzoin photoinitiators, benzil photoinitiators, benzophenone photoinitiators, ketal photoinitiators, and thioxanthone photoinitiators. Each of different photoinitiators may be used alone or in combination.

Examples of the benzoin ether photoinitiators include, but are not limited to, benzoin methyl ether, benzoin ethyl ether, benzoin propyl ether, benzoin isopropyl ether, benzoin isobutyl ether, 2,2-dimethoxy-1,2-diphenylethan-1-one, and anisole methyl ether. Examples of the acetophenone photoinitiators include, but are not limited to, 2,2-diethoxyacetophenone, 2,2-dimethoxy-2-phenylacetophenone, 1-hydroxycyclohexyl phenyl ketone, 4-phenoxydichloroacetophenone, and 4-(t-butyl)dichloroacetophenone. Examples of the α-ketol photoinitiators include, but are not limited to, 2-methyl-2-hydroxypropiophenone and 1-[4-(2-hydroxyethyl)phenyl]-2-methylpropan-1-one. A non-limiting example of the aromatic sulfonyl chloride photoinitiators is 2-naphthalenesulfonyl chloride. A non-limiting example of the photoactive oxime photoinitiators is 1-phenyl-1,1-propanedione-2-(o-ethoxycarbonyl)-oxime. A non-limiting example of the benzoin photoinitiators is benzoin. A non-limiting example of the benzil photoinitiator is benzil. Examples of the benzophenone photoinitiators include, but are not limited to, benzophenone, benzoylbenzoic acids, 3,3'-dimethyl-4-methoxybenzophenone, polyvinylbenzophenones, and α-hydroxycyclohexyl phenyl ketone. A non-limiting example of the ketal photoinitiators is benzil dimethyl ketal. Examples of the thioxanthone photoinitiators include, but are not limited to, thioxanthone, 2-chlorothioxanthone, 2-methylthioxanthone, 2,4-dimethylthioxanthone, isopropylthioxanthone, 2,4-diisopropylthioxanthone, and decylthioxanthone.

The photoinitiator(s) may be used in an amount not critical, but the lower limit of the amount is preferably 0.01 part by weight and more preferably 0.05 part by weight. The upper limit of the amount is preferably 5 parts by weight and more preferably 3 parts by weight, per 100 parts by weight of the monomer component(s) to constitute the acrylic polymer.

Upon photopolymerization, the irradiation energy and irradiation time of the active energy ray (in particular, ultraviolet ray), and any other conditions are not critical, as long as the photoinitiator is activated to initiate the reaction of the monomer component(s).

Examples of the thermal initiators include azo polymerization initiators such as 2,2'-azobisisobutyronitrile, 2,2'-azobis-2-methylbutyronitrile, dimethyl 2,2'-azobis(2-methylpropionate), 4,4'-azobis-4-cyanovaleric acid, azobisisovaleronitrile, 2,2'-azobis(2-amidinopropane) dihydrochloride, 2,2'-azobis[2-(5-methyl-2-imidazolin-2-yl)propane]dihydrochloride, 2,2'-azobis(2-methylpropionamidine) disulfate, 2,2'-azobis(N,N'-dimethyleneisobutyramidine) hydrochloride, and 2,2'-azobis[N-(2-carboxyethyl)-2-methylpropionamidine]hydrate; peroxide polymerization initiators such as dibenzoyl peroxide, t-butyl permaleate, t-butyl hydroperoxide, and hydrogen peroxide; persulfates such as potassium peroxodisulfate and ammonium persulfate; and redox polymerization initiators such as the combination of a peroxodisulfuric acid salt with sodium hydrogen sulfite, and the combination of a peroxide with sodium ascorbate. Each of different thermal initiators may be used alone or in combination.

The amount of the thermal initiator(s) is not critical, but may be selected within such a range that the initiator is commonly usable as a polymerization initiator. When polymerization is performed using heat, the acrylic polymer may be prepared typically by dissolving the monomer component(s) and the thermal initiator(s) in an appropriate solvent and performing a reaction typically at 20° C. to 100° C. (preferably 40° C. to 80° C.). The solvent is exemplified by, but not limited to, organic solvents such as toluene and ethyl acetate.

Thermally-Conductive Particles

The thermally-conductive pressure-sensitive adhesive sheet according to the present invention contains thermally-conductive particles in the pressure-sensitive adhesive layer. This configuration allows the pressure sensitive adhesive sheet to have good thermal conductivity, to resist burning, and to be flame-retardant so as to restrain flame spreading over the pressure-sensitive adhesive sheet. Specifically, the configuration gives excellent thermal conductivity and excellent flame retardancy (fire resistance) to the pressure-sensitive adhesive sheet. Each of different types of thermally-conductive particles may be used alone or in combination.

Examples of the thermally-conductive particles include, but are not limited to, metal hydroxides and hydrated metallic compounds. The hydrated metallic compounds are each a compound or a double salt containing the compound, where the compound has a kick-off temperature (decomposition start temperature) in the range of 150° C. to 500° C. and is represented by General Formula $M_{m1}O_{n1}\cdot XH_2O$, where M represents a metal; m1 and n1 are each determined by the valence of the metal and each represent an integer of 1 or more; and X represents the number of water of crystallization contained in the compound.

Examples of the metal hydroxides and the hydrated metallic compounds include, but are not limited to, aluminum hydroxides [$Al_2O_3\cdot 3H_2O$; or $Al(OH)_3$], boehmites [$Al_2O_3\cdot H_2O$; or $AlOOH$], magnesium hydroxides [$MgO\cdot H_2O$; or $Mg(OH)_2$], calcium hydroxides [$CaO\cdot H_2O$; or $Ca(OH)_2$], zinc hydroxide [$Zn(OH)_2$], silicic acids [$H_4SiO_4$; or $H_2SiO_3$; or $H_2Si_2O_5$], iron hydroxides [$Fe_2O_3$—$H_2O$ or $2FeO(OH)$], copper hydroxide [$Cu(OH)_2$], barium hydroxides [$BaO\cdot H_2O$; or $BaO\cdot 9H_2O$], zirconium oxide hydrates [$ZrO\cdot nH_2O$], tin oxide hydrate [$SnO\cdot H_2O$], basic magnesium carbonate[$3MgCO_3\cdot Mg(OH)_2\cdot 3H_2O$], hydrotalcite [$6MgO\cdot Al_2O_3\cdot H_2O$], dawsonite [$Na_2CO_3\cdot Al_2O_3\cdot nH_2O$], borax [$Na_2O\cdot B_2O_5\cdot 5H_2O$], and zinc borate[$2ZnO\cdot 3B_2O_5\cdot 3.5H_2O$]. Among them, aluminum hydroxides and magnesium hydroxides are preferred for obtaining excellent flame retardancy. Each of different hydrated metallic compounds and each of different metal hydroxides may be used alone or in combination independently.

The hydrated metallic compounds and the metal hydroxides may also be available as commercial products. Examples of the aluminum hydroxide commercial products include, but are not limited to, products available under the trade names of: HIGILITE H-100-ME (having an average particle size of 75 μm) (from Showa Denko K.K.), HIGILITE H-10 (having an average particle size of 55 μm) (from Showa Denko K.K.), HIGILITE H-31 (having an average particle size of 18 μm) (from Showa Denko K.K.), HIGILITE H-32 (having an average particle size of 8 μm) (from Showa Denko K.K.), HIGILITE H-42 (having an average particle size of 1 μm) (from Showa Denko K.K.), HIGILITE H-43M (having an average particle size of 0.8 μm) (from Showa Denko K.K.), and B103ST (having an average particle size of 8 μm) (from Nippon Light Metal Company, Ltd.). Examples of the magnesium hydroxide commercial products include, but are not limited to, products available under the trade names of: KISUMA 5A (having an average particle size of 1 μm) (from Kyowa Chemical Industry Co., Ltd.), and ECOMAG Z-10 (having an average particle size of 1.4 μm, from Tateho Chemical Industries Co., Ltd.).

Examples of the thermally-conductive particles also include, but are not limited to, metal nitrides such as boron nitride, aluminum nitride, silicon nitride, and gallium nitride; and metal oxides such as aluminum oxide (alumina), magnesium oxide, titanium oxide, zinc oxide, tin oxide, copper oxide, nickel oxide, and antimonate-doped tin oxide. In addition, examples of the thermally-conductive particles further include, but are not limited to, silicon carbide, silicon dioxide, calcium carbonate, barium titanate, potassium titanate, copper, silver, gold, nickel, aluminum, platinum, carbon black, carbon tubes (carbon nanotubes), carbon fibers, and diamond.

The thermally-conductive particles as mentioned above are also available as common commercial products. Examples of boron nitride commercial products include, but are not limited to, products available under the trade names of: HP-40 (from Mizushima Ferroalloy Co., Ltd.), and PT620 (from Momentive Performance Materials Inc.). Examples of aluminum oxide commercial products include, but are not limited to, products available under the trade names of: AS-50 (from Showa Denko K.K.), and AL-13KT (having an average particle size of 96 μm) (from Showa Denko K.K.). Examples of antimonate-doped tin commercial products include, but are not limited to, products available under the trade names of: SN-100S (from ISHIHARA SANGYO KAISHA, LTD.), SN-100P (from ISHIHARA SANGYO KAISHA, LTD.), and SN-100D (water dispersion product) (from ISHIHARA SANGYO KAISHA, LTD.). Examples of titanium oxide commercial products include, but are not limited to, products available under the trade names of TTO Series (from ISHIHARA SANGYO KAISHA, LTD.). Examples of zinc oxides commercial products include, but are not limited to, products available under the trade names of: SnO-310 (from Sumitomo Osaka Cement Co., Ltd.), SnO-350 (from Sumitomo Osaka Cement Co., Ltd.), and SnO-410 (from Sumitomo Osaka Cement Co., Ltd.).

In particular, of the thermally-conductive particles, preferred are metal hydroxides, hydrated metallic compounds, and metal oxides, of which aluminum hydroxides, alumina, and magnesium oxide are more preferred. These are preferred from the points of thermal conductivity, flame retardancy, and cost. Specifically, the thermally-conductive particles are preferably at least one type of particles selected from the group consisting of metal hydroxide, hydrated metallic compounds, and metal oxides; and are more preferably at least one type of particles selected from the group consisting of aluminum hydroxide, alumina, and magnesium oxide. Aluminum hydroxide is particularly preferred as the thermally-conductive particles.

Examples of the shape of the thermally-conductive particles include, but are not limited to, bulk, needle-like, plate-like, and laminar shapes. Examples of the bulk shape include, but are not limited to, spheroidal, rectangular solid (rectangular parallelepiped), and crushed shapes, and variations and deformed shapes corresponding to them.

The thermally-conductive particles may have an average particle size not critical, but preferably 0.1 to 1000 μm. The lower limit of the average particle size is more preferably 0.2 μm, and furthermore preferably 0.5 μm. The upper limit of the average particle size is more preferably 200 μm, furthermore preferably 100 μm, and particularly preferably 50 μm.

The average particle size is a volume-basis value determined by a laser-scattering particle size distribution measuring method. Specifically, the average particle size is a value determined by measuring a D50 using a laser-scattering particle size analyzer.

The pressure-sensitive adhesive layer may contain the the thermally-conductive particles in a total content not critical, but preferably from 25 percent by volume to 75 percent by volume based on the total volume (100 percent by volume) of the pressure-sensitive adhesive layer. The lower limit of the total content is more preferably 30 percent by volume. The upper limit of the total content is more preferably 70 percent by volume, and furthermore preferably 60 percent by volume. The pressure-sensitive adhesive layer, when containing the thermally-conductive particles in a content (proportion) of equal to or more than 25 percent by volume, may advantageously more readily have good thermal conductivity and/or good flame retardancy. The pressure-sensitive adhesive layer, when containing the thermally-conductive particles in a content (proportion) of equal to or less than 75 percent by volume, may advantageously restrain reduction in flexibility and reduction in adhesive strength and holding power. The unit "percent by volume" used in the content (proportion) can be converted into a unit "percent by weight" using the density of the thermally-conductive particles.

It is generally known that a pressure-sensitive adhesive layer, when containing thermally-conductive particles made typically of a metal hydroxide or a hydrated metallic compound, has better flame retardancy. The pressure-sensitive adhesive layer has increasing flame retardancy with an increasing proportion of the thermally-conductive particles in the layer. However, it is also known that the pressure-sensitive adhesive layer containing the thermally-conductive particles has a lower adhesive strength as compared with a pressure-sensitive adhesive layer devoid of the thermally-conductive particles. Assume that the pressure-sensitive adhesive layer contains the thermally-conductive particles in an excessively large proportion. In this case, the pressure-sensitive adhesive layer may fail to have a smooth surface and may have a rough surface and/or an uneven thickness. The pressure-sensitive adhesive layer, particularly when having a small thickness, may suffer from disadvantages such as thin spots (fade). The term "thin spots" refers to a state where the pressure-sensitive adhesive layer is present in certain areas, but is not present in one or more other areas. In contrast, the pressure-sensitive adhesive layer, if containing the thermally-conductive particles in an excessively small portion, may fail to enjoy the flame retarding effects. Specifically, it has been recognized that the use of the thermally-conductive particles hardly gives flame retardancy and tackiness both at satisfactory levels. However, the inventors of the present invention have found that the pressure-sensitive adhesive layer, when containing thermally-conductive particles having an small average particle size (e.g., having an average particle size of 0.1 to 10 µm), has better flame retardancy and less suffers from reduction in adhesive strength (tackiness). In particular, the pressure-sensitive adhesive layer, when containing the thermally-conductive particles that has an average particle size of equal to or less than 10 µm (in particular, equal to or less than 8 µm), may have a higher adhesive strength as compared with a pressure-sensitive adhesive layer having the same composition, except for being devoid of the thermally-conductive particles. In addition, the former pressure-sensitive adhesive layer has excellent flame retardancy.

Based on these, the average particle size of the thermally-conductive particles is preferably equal to or less than 10 µm (e.g., 0.1 to 10 µm). This is preferred from the viewpoints of flame retardancy and tackiness both at satisfactory levels and excellent coatability. In particular, the average particle size is preferably equal to or less than 8 µm (e.g., 0.1 to 8 µm), and more preferably equal to or less than 1 µm (e.g., 0.1 to 1 µm), from the viewpoints that the pressure-sensitive adhesive layer may less suffer from reduction in adhesive strength even when containing the thermally-conductive particles, but may have a higher adhesive strength as compared with a pressure-sensitive adhesive layer devoid of the thermally-conductive particles.

The proportion of the thermally-conductive particles having an average particle size of equal to or less than 10 µm is typically preferably 20 to 330 parts by weight, per 100 parts by weight of the base polymer, such as the acrylic polymer, in the pressure-sensitive adhesive layer. The lower limit of the proportion is more preferably 50 parts by weight, furthermore preferably 60 parts by weight, and particularly preferably 100 parts by weight. Assume that the pressure-sensitive adhesive layer contains the thermally-conductive particles in a proportion of equal to or more than 20 parts by weight. This pressure-sensitive adhesive layer may have excellent flame retardancy. Assume that the pressure-sensitive adhesive layer contains the thermally-conductive particles in a proportion of equal to or less than 330 parts by weight. This pressure-sensitive adhesive layer, even when having a small thickness (e.g., even when having a thickness of equal to or less than 50 µm), may have a high adhesive strength and may characteristically have excellent resistance to repulsion and excellent tackiness (tack) upon application. The "resistance to repulsion" refers to such a property that the pressure-sensitive adhesive layer resists separation from the adherend even when the pressure-sensitive adhesive layer is bent (e.g., bent 90 degrees or 180 degrees) in conformity to the shape of the adherend upon application. In addition, this pressure-sensitive adhesive layer may have a uniform thickness, may have a smooth surface without defects such as thin spots, and may be formed with excellent coatability. The "coatability" refers to such a property that a material can be easily applied to form a pressure-sensitive adhesive layer having a uniform thickness and having a smooth surface.

From the viewpoints of excellent flame retardancy and excellent tackiness, the pressure-sensitive adhesive layer preferably contains the thermally-conductive particles having an average particle size of equal to or less than 10 µm (preferably equal to or less than 8 µm, and furthermore preferably equal to or less than 5 µm) in a proportion of 20 to 330 parts by weight (preferably 50 to 300 parts by weight, and more preferably 100 to 300 parts by weight), per 100 parts by weight of the base polymer, such as the acrylic polymer, in the pressure-sensitive adhesive layer.

Two or more different types of thermally-conductive particles having different average particle sizes may be used in combination as the thermally-conductive particles. Assume that two or more different types of thermally-conductive particles having different average particle sizes are used in combination. In this case, it is preferred that, for example in an embodiment, particles having an average particle size of equal to or more than 5 µm are used in combination with particles having an average particle size of less than 5 µm. The combination use of two or more different thermally-conductive particles having different average particle sizes allows the thermally-conductive particles to be packed more densely in the pressure-sensitive adhesive layer. For obtaining these effects, for example, the compositional ratio (weight ratio) of the particles having an average particle size of equal to or more than 5 µm to the particles having an average particle size of less than 5 µm is preferably from 1:10 to 10:1, more preferably from 1:5 to 5:1, and furthermore preferably from 1:2 to 2:1.

In another embodiment, thermally-conductive particles having an average particle size of equal to or more than 10 µm (group A of particles) may be used in combination with thermally-conductive particles having an average particle size of less than 10 µm (group B of particles) as the thermally-conductive particles. The combination use of the group A of particles and the group B of particles may allow the pressure-sensitive adhesive composition to more readily form a close-packed structure. The pressure-sensitive adhesive composition having such a close-packed structure may have better (higher) fluidity and a lower viscosity and may offer still better adhesion (have a still higher adhesive strength) to the adherend. The configuration may also allow the pressure-sensitive adhesive layer to readily have a uniform thickness. The blending ratio (weight ratio) of the group A of particles to the group B of particles is preferably from 2:8 to 8:2 and more preferably from 3:7 to 7:3. The group A of particles may have an average particle size of typically 10 to 100 µm. The lower limit of the average particle size is preferably 12 µm and more preferably 15 µm. The upper limit of the average particle size is preferably 50 µm, more preferably 30 µm, and furthermore preferably 25 µm. The group B of particles may have an average particle size of typically from 0.1 µm to less than 10 µm. The lower limit of the average particle size is preferably 0.3 µm and more preferably 0.5 µm. The upper limit of the average particle size is preferably 8 µm, more preferably 5 µm, and furthermore preferably 3 µm.

Dispersing Agent

The pressure-sensitive adhesive layer may further include a dispersing agent, within a range not adversely affecting the advantageous effects of the present invention. The dispersing agent may be included so as to allow the thermally-conductive particles to stably disperse without aggregation.

The dispersing agent is not limited, but is preferably selected from phosphoric esters. Examples of the phosphoric esters include, but are not limited to, phosphoric monoesters of polyoxyethylene alkyl (or alkyl allyl) ethers and of polyoxyethylene alkyl aryl ethers; phosphoric diesters and phosphoric triesters of polyoxyethylene alkyl ethers and of polyoxyethylene alkyl aryl ethers; and derivatives of them. Among them, preferred are phosphoric monoesters and phosphoric diesters of polyoxyethylene alkyl ethers and of polyoxyethylene alkyl aryl ethers. The pressure-sensitive adhesive layer may include each of different dispersing agents alone or in combination.

The proportion of the dispersing agent is not critical, but is preferably 0.01 to 10 parts by weight per 100 parts by weight of the base polymer (e.g., the acrylic polymer when the pressure-sensitive adhesive layer is an acrylic pressure-sensitive adhesive layer) in the pressure-sensitive adhesive layer. The lower limit of the proportion is more preferably 0.05 part by weight and furthermore preferably 0.1 part by weight. The upper limit of the proportion is more preferably 5 parts by weight and furthermore preferably 3 parts by weight.

The dispersing agent may be available as common commercial products. Examples of such commercial products include, but are not limited to, products available under the trade names of: PLYSURF A212E (from Dai-ichi Kogyo Seiyaku Co., Ltd.), PLYSURF A210G (from Dai-ichi Kogyo Seiyaku Co., Ltd.), PLYSURF A212C (from Dai-ichi Kogyo Seiyaku Co., Ltd.), PLYSURF A210F (from Dai-ichi Kogyo Seiyaku Co., Ltd.); Phosphanol RE610 (from Toho Chemical Industry Co., Ltd.), Phosphanol RS710 (from Toho Chemical Industry Co., Ltd.), and Phosphanol RS610 (from Toho Chemical Industry Co., Ltd.).

Fluorochemical Surfactant

The pressure-sensitive adhesive layer may further include a fluorochemical surfactant. The use of the fluorochemical surfactant may allow the pressure-sensitive adhesive layer to have lower adhesion and lower frictional resistance between the base polymer and the thermally-conductive particles and may have better stress dispersibility. This may allow the thermally-conductive pressure-sensitive adhesive sheet according to the present invention to have higher tackiness.

The fluorochemical surfactant is preferably, but is not limited to, any of fluorochemical surfactants each containing an oxy-$C_2$-$C_3$ alkylene group and a fluorinated hydrocarbon group in the molecule. Among them, the fluorochemical surfactant is preferably a fluorochemical nonionic surfactant containing an oxy-$C_2$-$C_3$ alkylene group and a fluorinated hydrocarbon group in the molecule. This is preferred from the viewpoint of dispersibility in the base polymer such as the acrylic polymer. The pressure-sensitive adhesive layer may include each of different fluorochemical surfactants alone or in combination.

The fluorinated hydrocarbon group is preferably, but not limitatively, a perfluoro group. The perfluoro group may be a monovalent group, or a divalent or higher-valent group. The fluorinated hydrocarbon group may contain a double bond and/or a triple bond and may have any of a straight-chain structure, a branched structure, and a cyclic structure. The number of carbon atoms in the fluorinated hydrocarbon group is not critical, but typically preferably 1, or equal to or more than 2, more preferably 3 to 30, and furthermore preferably 4 to 20. Assume that the pressure-sensitive adhesive layer contains bubbles. In this case, the fluorocarbon surfactant, when containing the fluorinated hydrocarbon group, may also effectively allow the bubbles to be mixed more satisfactorily with, and to be present more stably in the pressure-sensitive adhesive layer. The fluorochemical surfactant may contain each of different fluorinated hydrocarbon groups alone or in combination as introduced into the molecule.

The oxy-$C_2$-$C_3$ alkylene group is represented by the formula: —R—O— where R represents a straight chain or branched chain alkylene group containing 2 or 3 carbon atoms. Examples of the oxy-$C_2$-$C_3$ alkylene group include, but are not limited to, oxyethylene group (—$CH_2CH_2O$—) and oxypropylene group [—$CH_2CH(CH_3)O$—]. The oxy-$C_2$-$C_3$ alkylene group may be in alcohol, ether, ester, or any other form. In the alcohol, a hydrogen atom is bonded to the terminal oxygen atom. In the ether, the oxy-$C_2$-$C_3$ alkylene group is bonded to another hydrocarbon group. In the ester, the oxy-$C_2$-$C_3$ alkylene group is bonded via a carbonyl group to another hydrocarbon group. The oxy-$C_2$-$C_3$ alkylene group may also be in a form including a cyclic structure partially having any of the structures, such as a cyclic ether or a lactone. The fluorochemical surfactant may contain each of different oxy-$C_2$-$C_3$ alkylene groups alone or in combination as introduced into the molecule.

Examples of the fluorochemical surfactant include, but are not limited to, copolymers each obtained by polymerizing monomer components including an oxy-$C_2$-$C_3$ alkylene-containing monomer and a fluorinated hydrocarbon group-containing monomer. The fluorochemical surfactant, when being a copolymer, may be any of block copolymers, graft copolymers, and any other copolymers.

The block copolymers are copolymers containing an oxy-$C_2$-$C_3$ alkylene group and a fluorinated hydrocarbon group in the backbone. Examples of the block copolymers include, but are not limited to, polyoxyethylene perfluoroalkyl ethers, polyoxyethylene perfluoroalkylates, polyoxypropylene perfluoroalkyl ethers, polyoxyisopropylene perfluoroalkyl ethers, polyoxyethylene sorbitan perfluoroalkylates, polyoxyethylene polyoxypropylene block copolymer perfluoroalkylates, and polyoxyethylene glycol perfluoroalkylates.

The graft copolymers are copolymers each containing an oxy-$C_2$-$C_3$ alkylene group and a fluorinated hydrocarbon group in a side chain or side chains. Examples of the graft copolymers include, but are not limited to, copolymers obtained by polymerizing monomer components including a vinyl compound containing a polyoxyalkylene group and another vinyl compound containing a fluorinated hydrocarbon group. Among them, acrylic copolymers are preferred. Examples of the vinyl compound containing a polyoxyalkylene group include, but are not limited to, polyoxyalkylene (meth)acrylates such as polyoxyethylene (meth)acrylates, polyoxypropylene (meth)acrylates, and polyoxyethylene polyoxypropylene (meth)acrylates. Examples of the vinyl compound containing a fluorinated hydrocarbon group include, but are not limited to, (meth) acrylic esters containing a fluorinated hydrocarbon group, including perfluoroalkyl (meth)acrylates such as perfluorobutyl (meth)acrylate, perfluoroisobutyl (meth)acrylate, and perfluoropentyl (meth)acrylate.

In addition to the oxy-$C_2$-$C_3$ alkylene groups and fluorinated hydrocarbon groups, the fluorochemical surfactant may further contain one or more of various functional groups within ranges not adversely affecting the dispersibility in the acrylic polymer. Examples of the functional groups include, but are not limited to, alicyclic hydrocarbon groups, aromatic hydrocarbon groups, carboxy group, sulfonic group, cyano group, amido group, and amino group. For example, when the fluorochemical surfactant is a vinyl copolymer, the fluorochemical surfactant may be derived from monomer components further including a monomer component that is copolymerizable with the polyoxyalkylene-containing vinyl compound and with the fluorinated hydrocarbon group-containing vinyl compound. Each of different copolymerizable monomers may be used alone or in combination.

Examples of the copolymerizable monomer components include, but are not limited to, (meth)acrylic $C_1$-$C_{20}$ alkyl esters such as undecyl (meth)acrylate and dodecyl (meth) acrylate; (meth)acrylic esters containing an alicyclic hydrocarbon group, such as cyclopentyl (meth)acrylate; and (meth)acrylic esters containing an aromatic hydrocarbon group, such as phenyl (meth)acrylate. These may be used preferably. Examples of the copolymerizable monomer components further include carboxy-containing monomers such as maleic acid and crotonic acid; sulfonate-containing monomers such as sodium vinylsulfonate; aromatic vinyl compounds such as styrene and vinyltoluenes; olefins and dienes such as ethylene and butadiene; vinyl ethers such as vinyl alkyl ethers; amido-containing monomers such as acrylamide; amino-containing monomers such as (meth) acryloylmorpholine; glycidyl-containing monomers such as methylglycidyl (meth)acrylate; isocyanato-containing monomers such as 2-methacryloyloxyethyl isocyanate; and multifunctional copolymerizable monomers (multifunctional monomers) such as dipentaerythritol hexa(meth)acrylate and divinylbenzene.

The fluorochemical surfactant may have a weight-average molecular weight not critical. However, the fluorochemical surfactant, when having a weight-average molecular weight of typically less than 20000 (e.g., from 500 to less than 20000), may highly effectively reduce the adhesion and frictional resistance between the base polymer (such as the acrylic polymer) and the thermally-conductive particles. This fluorochemical surfactant may be used in combination with a fluorochemical surfactant having a weight-average molecular weight of equal to or more than 20000 (e.g., 20000 to 100000, preferably 22000 to 80000, and furthermore preferably 24000 to 60000). When the pressure-sensitive adhesive layer contains bubbles, the combination use of the fluorochemical surfactants may allow the bubbles to be mixed more satisfactorily and may allow the mixed bubbles to be present more stably in the pressure-sensitive adhesive layer.

The fluorochemical surfactant(s) may be used in an amount (solids content) not critical, but typically preferably 0.01 to 5 parts by weight per 100 parts by weight of all monomer components to form the base polymer such as the acrylic polymer (per 100 parts by weight of the base polymer). The lower limit of the amount is preferably 0.02 part by weight and more preferably 0.03 part by weight. The upper limit of the amount is preferably 3 parts by weight and more preferably 2 parts by weight. The fluorochemical surfactant(s), when used in an amount of equal to or more than 0.01 part by weight, may allow bubbles to be present stably in the case where the pressure-sensitive adhesive layer contains the bubbles. The fluorochemical surfactant(s), when used in an amount of equal to or less than 5 parts by weight, may offer good adhesive performance.

The pressure-sensitive adhesive layer may include both the dispersing agent and the fluorochemical surfactant in combination. This configuration may allow the metal hydroxide and/or the hydrated metallic compound to be present stably without aggregation even when the dispersing agent and the fluorochemical surfactant are used in smaller contents as compared with the case where the dispersing agent or the fluorochemical surfactant is used alone. Thus, the pressure-sensitive adhesive layer may offer better stress dispersibility and may be expected to have higher tackiness. Assume that the dispersing agent and the fluorochemical surfactant are used in combination. In this case, the proportions of the two components are not critical, but the ratio (weight ratio) of the dispersing agent to the fluorochemical surfactant is preferably from 1:20 to 20:0.01, more preferably from 1:10 to 10:0.01, and furthermore preferably from 1:5 to 5:0.01.

Specific examples of the fluorochemical surfactant containing an oxy-$C_2$-$C_3$ alkylene group and a fluorinated hydrocarbon group and having a weight-average molecular weight of less than 20000 include, but are not limited to, products available under the trade names of: FTERGENT 251 (from NEOS Co., Ltd.), FTX-218 (from NEOS Co., Ltd.), Megafac F-477 (from DIC Corporation), Megafac F-470 (from DIC Corporation), Surflon S-381 (from AGC Seimi Chemical Co., Ltd.), Surflon S-383 (from AGC Seimi Chemical Co., Ltd.), Surflon S-393 (from AGC Seimi Chemical Co., Ltd.), Surflon KH-20 (from AGC Seimi Chemical Co., Ltd.), and Surflon KH-40 (from AGC Seimi Chemical Co., Ltd.). Examples of the fluorochemical surfactant containing an oxy-$C_2$-$C_3$ alkylene group and a fluorinated hydrocarbon group and having a weight-average molecular weight of equal to or more than 20000 include, but are not limited to, products available under the trade names of: EFTOP EF-352 (from Mitsubishi Materials Electronic Chemicals Co., Ltd.), EFTOP EF-801 (from Mitsubishi Materials Electronic Chemicals Co., Ltd.), and Unidyne TG-656 (from Daikin Industries Ltd.).

Crosslinking Agent

The pressure-sensitive adhesive layer may further include a crosslinking agent from the viewpoint of adjusting the cohesive force of the pressure-sensitive adhesive layer. The crosslinking agent may be selected from known or common crosslinking agents and is exemplified by, but is not limited to, epoxy crosslinking agents, isocyanate crosslinking agents, silicone crosslinking agents, oxazoline crosslinking agents, aziridine crosslinking agents, silane crosslinking agents, alkyl-etherified melamine crosslinking agents, and metal chelate crosslinking agents. Among them, isocyanate crosslinking agents and epoxy crosslinking agents are preferred.

Examples of the isocyanate crosslinking agents include, but are not limited to, tolylene diisocyanate, hexamethylene diisocyanate, isophorone diisocyanate, xylylene diisocyanates, hydrogenated xylylene diisocyanates, diphenylmethane diisocyanates, hydrogenated diphenylmethane diisocyanates, tetramethylxylylene diisocyanates, naphthalene diisocyanates, triphenylmethane triisocyanate, polymethylene polyphenyl isocyanates, and adducts of any of these isocyanates with a polyol such as trimethylolpropane. Examples of the isocyanate crosslinking agents also include, but are not limited to, compounds each containing at least one isocyanato group and at least one unsaturated bond per molecule, such as 2-isocyanatoethyl (meth)acrylate.

Examples of the epoxy crosslinking agents include, but are not limited to, bisphenol-A-epichlorohydrin epoxy resins, ethylene glycidyl ether, polyethylene glycol diglycidyl ethers, glycerol diglycidyl ether, glycerol triglycidyl ether, 1,6-hexanediol glycidyl ether, trimethylolpropane triglycidyl ether, diglycidylaniline, diamineglycidylamine, N,N,N',N'-tetraglycidyl-m-xylylenediamine, and 1,3-bis(N,N'-diamineglycidylaminomethyl)cyclohexane.

The pressure-sensitive adhesive layer may contain the crosslinking agent in a proportion not critical, but typically preferably 0.01 to 5 parts by weight per 100 parts by weight of the base polymer, such as the acrylic polymer, in the pressure-sensitive adhesive layer. The upper limit of the proportion is more preferably 3 parts by weight, and furthermore preferably 2 parts by weight. The pressure-sensitive adhesive layer, when containing the crosslinking agent in a proportion of equal to or less than 5 parts by weight, may have good flexibility; and, when containing the crosslinking agent in a proportion of equal to or more than 0.01 part by weight, may have high cohesiveness.

Tackifier Resin

The pressure-sensitive adhesive layer may further include a tackifier resin from the viewpoint of providing still better tackiness. In particular, assume that monomer component(s) to constitute the base polymer (such as the acrylic polymer) is devoid of carboxy-containing monomers. In this case, the pressure-sensitive adhesive layer, when having a small thickness, may hardly have a high adhesive strength. To prevent or minimize this, the pressure-sensitive adhesive layer preferably includes the tackifier resin. The tackifier resin is preferably exemplified by, but is not limited to, hydrogenated tackifier resins. The hydrogenated tackifier resins are preferred because the coexistence of any of them may less lead to polymerization inhibition when the copolymerization of monomer component(s) to form the acrylic polymer is performed by the application of ultraviolet rays. Examples of the hydrogenated tackifier resins include, but are not limited to, hydrogenated rosinous resins, hydrogenated petroleum resins, hydrogenated terpene resins, and other hydrogenated derivatives derived from tackifier resins such as rosinous resins, petroleum resins, terpene resins, coumarone-indene resins, styrenic resins, alkylphenol resins, and xylene resins. Among them, hydrogenated rosinous resins are preferred. The hydrogenated rosinous tackifier resins include, but are not limited to, modified rosins that are derived from unmodified rosins (raw rosins) and are modified by hydrogenation. The unmodified rosins are exemplified by, but are not limited to, gum rosin, wood rosin, and tall oil rosin.

The tackifier resin may have a softening point not critical, but typically preferably 80° C. to 200° C. and more preferably 90° C. to 200° C. The tackifier resin, when having a softening point within the range, may have still higher cohesive force.

The pressure-sensitive adhesive layer may contain the tackifier resin in a proportion not critical, but preferably 1 to 50 parts by weight per 100 parts by weight of the base polymer, such as the acrylic polymer, in the pressure-sensitive adhesive layer. The lower limit of the proportion is more preferably 2 parts by weight, and furthermore preferably 3 parts by weight. The upper limit of the proportion is more preferably 40 parts by weight, and furthermore preferably 30 parts by weight. The pressure-sensitive adhesive layer, when containing the tackifier resin in a proportion of equal to or less than 50 parts by weight, may have high cohesive force; and, when containing the tackifier resin in a proportion of equal to or more than 1 part by weight, may have a high adhesive strength.

The tackifier resin may be selected from common commercial products. Examples of the commercial products include, but are not limited to, hydrogenated rosinous resins available under the trade names of: SUPER ESTER A-100 (having a softening point of 95° C. to 105° C., from Arakawa Chemical Industries, Ltd.) and SUPER ESTER A-125 (having a softening point of 120° C. to 130° C., from Arakawa Chemical Industries, Ltd.).

Acrylic Oligomer

The pressure-sensitive adhesive layer may further include an acrylic oligomer from the viewpoint of providing still better tackiness. The acrylic oligomer is a polymerized substance having a higher glass transition temperature (Tg) and a lower weight-average molecular weight as compared with the acrylic polymer. The acrylic oligomer having this configuration functions as a tackifier resin and still less leads to polymerization inhibition upon polymerization using ultraviolet rays.

Silane Coupling Agent

The pressure-sensitive adhesive layer may further include a silane coupling agent from the points of providing adhesive strength and endurance at still higher levels and for providing better affinity between the thermally-conductive particles and the base polymer such as the acrylic polymer.

The silane coupling agent may be appropriately selected from known ones and is exemplified by, but is not limited to, epoxy-containing silane coupling agents such as 3-glycidoxypropyltrimethoxysilane, 3-glycidoxypropyltriethoxysilane, 3-glycidoxypropylmethyldiethoxysilane, and 2-(3,4-epoxycyclohexyl)ethyltrimethoxysilane; amino-containing silane coupling agents such as 3-aminopropyltrimethoxysilane, N-2-(aminoethyl)-3-aminopropylmethyldimethoxysilane, and 3-triethoxysilyl-N-(1,3-dimethylbutylidene)propylamine; (meth)acryl-containing silane coupling agents such as 3-acryloxypropyltrimethoxysilane and 3-methacryloxypropyltriethoxysilane; and isocyanato-containing silane coupling agents such as 3-isocyanatopropyltriethoxysilane. The pressure-sensitive adhesive layer may include each of different silane coupling agents alone or in combination.

The pressure-sensitive adhesive layer may contain the silane coupling agent(s) in a proportion not critical, but typically preferably 0.01 to 10 parts by weight per 100 parts by weight of the base polymer, such as the acrylic polymer, in the pressure-sensitive adhesive layer. The lower limit of the proportion is more preferably 0.02 part by weight and furthermore preferably 0.05 part by weight. The upper limit of the proportion is more preferably 5 parts by weight and furthermore preferably 2 parts by weight. The pressure-sensitive adhesive layer, when employing the silane coupling agent(s) in a proportion within the range, may have cohesive force and/or durability at still higher levels.

Bubbles

The pressure-sensitive adhesive layer may be a pressure-sensitive adhesive layer containing bubbles. The presence of bubbles in the pressure-sensitive adhesive layer may impart a certain thickness and cushioning properties to the pressure-sensitive adhesive layer and may allow the pressure-sensitive adhesive layer to have better performance to bury or bridge asperities in the adherend surface, namely, to absorb (conform to) the asperities more satisfactorily.

Other Additives

The pressure-sensitive adhesive layer may further include one or more other additives according to the intended use, in addition to the base polymer (such as the acrylic polymer), the thermally-conductive particles, the dispersing agent, the fluorochemical surfactant, the crosslinking agent, the tackifier resin, the acrylic oligomer, and the silane coupling agent. Examples of the other additives include, but are not limited to, plasticizers, fillers, age inhibitors (antioxidants), and colorants (e.g., pigments and dyestuffs).

The pressure-sensitive adhesive layer may have a thickness of typically 25 to 400 μm. The lower limit of the thickness is preferably 45 μm, more preferably 50 μm, furthermore preferably 75 μm, and particularly preferably 100 μm. The upper limit of the thickness is preferably 250 μm, more preferably 200 μm, and furthermore preferably 150 μm. The pressure-sensitive adhesive layer, when having a thickness within the range, may have adhesive strength and holding power at sufficient levels.

The pressure-sensitive adhesive layer may be formed from (derived from) a pressure-sensitive adhesive composition as a mixture of the base polymer (such as the acrylic polymer) with the thermally-conductive particles, and one or more optional components such as the dispersing agent, added as needed. Specifically, the pressure-sensitive adhesive layer may be formed typically from a pressure-sensitive adhesive composition prepared in the following manner. Initially, the monomer components to form the base polymer (such as the acrylic polymer) is mixed with the polymerization initiator, an appropriate solvent, and any other optional components to give a monomer solution. The polymerization initiator is exemplified by, but not limited to, photoinitiators and thermal initiators. The solvent is exemplified by, but not limited to, toluene and ethyl acetate. The monomer solution is subjected to a polymerization reaction corresponding to the type of the polymerization initiator. This gives a polymer solution containing the base polymer (such as the acrylic polymer) that is derived from the monomer components via copolymerization. The polymer solution is combined with the thermally-conductive particles and the dispersing agent, and any other optional components as needed to give the pressure-sensitive adhesive composition that has a viscosity suitable for coating. When curing is performed by active energy ray irradiation such as ultraviolet irradiation, the pressure-sensitive adhesive layer may be formed typically in the following manner. Initially, the monomer components to form the base polymer (such as the acrylic polymer) is mixed with a photoinitiator and any other optional components to give a monomer mixture. The monomer mixture is irradiated with active energy rays such as ultraviolet rays to give a composition (syrup) including a partially polymerized product in which only part of the monomer components is polymerized. The syrup is combined with the thermally-conductive particles and, as needed, the dispersing agent and/or any other optional components to give a composition having a viscosity suitable for coating. The composition is used to form the pressure-sensitive adhesive layer.

The pressure-sensitive adhesive composition preferably has a moderate viscosity from the viewpoint of having excellent coatability. The viscosity of the pressure-sensitive adhesive composition is typically preferably 0.5 to 50 Pa·s. The lower limit of the viscosity is more preferably 1 Pa·s, and furthermore preferably 5 Pa·s. The upper limit of the viscosity is more preferably 40 Pa·s. The pressure-sensitive adhesive composition, when having a viscosity of equal to or less than 50 Pa·s, may be easily applied to form the pressure-sensitive adhesive layer. The term "viscosity" as used in the description refers to a viscosity measured using a BH viscometer with a No. 5 rotor at a number of revolutions of 10 rpm and at a measurement temperature of 30° C.

The viscosity of the pressure-sensitive adhesive composition may be adjusted typically by blending one or more polymer components such as acrylic rubbers and thickening additives; and/or by partially polymerizing monomer components for the formation of the acrylic polymer to give a partially polymerized product. Examples of the monomer components include (meth)acrylic esters and other monomer components to form the acrylic polymer.

Release Liner

The pressure-sensitive adhesive layer surface (adhesive face) of the thermally-conductive pressure-sensitive adhesive sheet according to the present invention may be protected by a release liner before use. The release liner is used as a protector for the pressure-sensitive adhesive layer and will be removed upon application of the pressure-sensitive adhesive sheet to the adherend. The release liner does not necessarily have to be disposed.

The release liner may be selected typically from common release paper. Specifically, examples of the release liner include, but are not limited to, bases each bearing a release treatment layer on at least one surface thereof, where the release treatment layer is formed from a release agent; low-adhesive bases made of fluorocarbon polymers; and low-adhesive bases made of nonpolar polymers. Examples of the fluorocarbon polymers include polytetrafluoroethylenes, polychlorotrifluoroethylenes, poly(vinyl fluoride)s, poly(vinylidene fluoride)s, tetrafluoroethylene-hexafluoropropylene copolymers, and chlorofluoroethylene-vinylidene fluoride copolymers. Examples of the nonpolar polymers include olefinic resins such as polyethylenes and polypropylenes.

Appropriate examples of the release liner include release liners each including a release liner base, and a release treatment layer disposed on at least one side of the base. Examples of the release liner base include, but are not limited to, plastic base films (synthetic resin films); papers; and multilayered composites (e.g., two- or three-layered composites) of these bases typically via lamination and/or coextrusion. Examples of the plastic base films include polyester films such as poly(ethylene terephthalate) films; olefinic resin films such as polyethylene films and polypropylene films; poly(vinyl chloride) films; polyimide films;

polyamide films (nylon films); and rayon films. Examples of the papers include, but are not limited to, woodfree paper, Japanese paper, kraft paper, glassine paper, synthetic paper, and top-coated paper.

Examples of the release agent to constitute the release treatment layer include, but are not limited to, silicone release agents, fluorine-containing release agents, and long-chain alkyl release agents. Each of different release agents may be used alone or in combination. The release liner is not limited typically in thickness and formation technique.

A method for producing the thermally-conductive pressure-sensitive adhesive sheet according to the present invention may vary depending typically on the formulation of the pressure-sensitive adhesive composition and may be selected from, but not limited to, known formation methods. Examples of the production method include, but are not limited to, methods (1) to (4) as follows.

In the method (1), there is used a pressure-sensitive adhesive composition that includes the monomer component(s) to form the base polymer (such as the acrylic polymer), a partially polymerized product of the monomer component(s), the thermally-conductive particles, and, as needed, the dispersing agent and/or any other optional components. The pressure-sensitive adhesive composition is applied onto a non-adhesive layer (e.g., the substrate) to form a composition layer. The composition layer is cured to form a pressure-sensitive adhesive layer. This gives the pressure-sensitive adhesive sheet. Examples of the curing include heat curing; and curing by the application of active energy rays such as ultraviolet rays.

In the method (2), there is used a pressure-sensitive adhesive composition that includes the monomer component(s) to form the base polymer (such as the acrylic polymer), a partially polymerized product of the monomer component(s), the thermally-conductive particles, and, as needed, the dispersing agent and/or any other optional components. The pressure-sensitive adhesive composition is applied onto a separator to form a composition layer. The composition layer is cured to form a pressure-sensitive adhesive layer. The formed pressure-sensitive adhesive layer is transferred onto a non-adhesive layer (e.g., the substrate). This gives the pressure-sensitive adhesive sheet. Examples of the curing include heat curing; and curing by the application of active energy rays such as ultraviolet rays.

In the method (3), there is used a pressure-sensitive adhesive composition that includes the base polymer such as the acrylic polymer (including one in the form of a polymer solution), the thermally-conductive particles, and, as needed, the dispersing agent and/or any other optional components, where these components are uniformly dissolved or dispersed in the composition. The pressure-sensitive adhesive composition is applied onto a non-adhesive layer (e.g., the substrate) and dried to form a pressure-sensitive adhesive layer. This gives the pressure-sensitive adhesive sheet.

In the method (4), there is used a pressure-sensitive adhesive composition that includes the base polymer such as the acrylic polymer (including one in the form of a polymer solution), the thermally-conductive particles, and, as needed, the dispersing agent and/or any other optional components, where these components are uniformly dissolved or dispersed in the composition. The pressure-sensitive adhesive composition is applied onto a separator and dried to form a pressure-sensitive adhesive layer. The formed pressure-sensitive adhesive layer is transferred onto a non-adhesive layer (e.g., the substrate). This gives the pressure-sensitive adhesive sheet.

The curing in the methods (1) to (4) is preferably performed as curing by active energy rays (in particular curing by ultraviolet rays). Advantageously, this curing technique can be performed with excellent productivity and can form a homogeneous pressure-sensitive adhesive layer having a smooth surface, even when the pressure-sensitive adhesive layer is designed to contain the thermally-conductive particles and to have a small thickness. The curing by active energy rays may be inhibited by oxygen in the air. To prevent or minimize this, the curing is, for example, preferably performed under exclusion of oxygen. The exclusion of oxygen is performed typically by applying a separator onto the pressure-sensitive adhesive layer; or by performing the curing in a nitrogen atmosphere.

Assume that the pressure-sensitive adhesive layer to be formed is a bubble-containing pressure-sensitive adhesive layer. In this case, the bubble-containing pressure-sensitive adhesive layer may be formed by introducing and mixing bubbles (a bubble-constituting gas) into and with the pressure-sensitive adhesive composition including the thermally-conductive particles to give a bubble-containing pressure-sensitive adhesive composition; and applying the bubble-containing pressure-sensitive adhesive composition to a predetermined surface.

The application of the pressure-sensitive adhesive composition onto the predetermined surface may be performed by any of known coating techniques. Examples of the coating techniques include, but are not limited to, roll coating, kiss-contact roll coating, gravure coating, reverse coating, roll brushing, spray coating, dip roll coating, bar coating, knife coating, air knife coating, curtain coating, lip coating, and extrusion coating typically with a die coater.

The thermally-conductive pressure-sensitive adhesive sheet according to the present invention may have a thickness (total thickness) of typically 50 to 500 µm so as to provide for recent down sizing of mobile devices and household electrical appliances. The lower limit of the thickness is preferably 80 µm, more preferably 100 µm, and furthermore preferably 140 µm. The upper limit of the thickness is preferably 300 µm, more preferably 250 µm, and furthermore preferably 240 µm. The thermally-conductive pressure sensitive adhesive sheet, when having a thickness of equal to or more than 50 µm or more, may more readily conform to bumps and may have better bump absorptivity (conformability to bumps). The thermally-conductive pressure sensitive adhesive sheet, when having a thickness of equal to or less than 500 µm or less, may have still better resistance to repulsion. The thickness (total thickness) of the thermally-conductive pressure-sensitive adhesive sheet excludes the thickness of the release liner.

The thermally-conductive pressure-sensitive adhesive sheet according to the present invention may have a ratio of the thickness of the non-adhesive layer (e.g., the substrate) to the thickness of the pressure-sensitive adhesive layer of typically 0.04 to 1.0. The lower limit of the ratio is preferably 0.05, and more preferably 0.06. The upper limit of the thickness is preferably 0.6, more preferably 0.4, and furthermore preferably 0.3. The thermally-conductive pressure sensitive adhesive sheet, when having a ratio of the thickness of the non-adhesive layer (e.g., the substrate) to the thickness of the pressure-sensitive adhesive layer within the range, may have thermal conductivity, resistance to wrinkling upon application, and smoothness at more excellent levels.

The thermally-conductive pressure-sensitive adhesive sheet according to the present invention may have a ratio of the thickness of the non-adhesive layer (e.g., the substrate)

to the total thickness of the pressure-sensitive adhesive sheet of typically 0.03 to 0.6. The lower limit of the ratio is preferably 0.04, and more preferably 0.05. The upper limit of the ratio is preferably 0.5, more preferably 0.3, and furthermore preferably 0.2. The thermally-conductive pressure sensitive adhesive sheet, when having a ratio the thickness of the non-adhesive layer (e.g., the substrate) to the thickness of the pressure-sensitive adhesive sheet within the range, may have thermal conductivity, resistance to wrinkling upon application, and smoothness at more excellent levels.

The thermally-conductive pressure-sensitive adhesive sheet according to the present invention may have a 180-degree peel adhesive strength (180-degree peel adhesion) of the adhesive face of preferably equal to or more than 2 N/20 mm (e.g., 2 to 20 N/20 mm) and more preferably equal to or more than 2.5 N/20 mm (e.g., 2.5 to 20 N/20 mm). The 180-degree peel adhesion is measured with respect to a SUS304 steel sheet under peel conditions of 23° C., 50% relative humidity, a tensile speed of 300 mm/min, and a peel angle of 180 degrees.

The thermally-conductive pressure-sensitive adhesive sheet according to the present invention preferably has a thermal resistance of equal to or less than 6 K·cm$^2$/W. The upper limit of the thermal resistance is more preferably 5 K·cm$^2$/W, and furthermore preferably 4.5 K·cm$^2$/W. The lower limit of the thermal resistance is typically 1 K·cm$^2$/W and generally 3 K·cm$^2$/W. The thermally-conductive pressure sensitive adhesive sheet, when having a thermal resistance within this range, may have more excellent thermal conductivity.

The thermally-conductive pressure-sensitive adhesive sheet according to the present invention preferably has a coefficient of thermal conductivity of equal to or more than 0.3 W/m·K. The lower limit of the coefficient of thermal conductivity is more preferably 0.4 W/m·K and furthermore preferably 0.45 W/m·K. The upper limit of the coefficient of thermal conductivity is typically 2.0 W/m·K and generally 1.5 W/m·K. The thermally-conductive pressure sensitive adhesive sheet, when having a coefficient of thermal conductivity within this range, may have more excellent thermal conductivity.

The thermal resistance and the coefficient of thermal conductivity may be evaluated by the method described in "(1) thermal resistance and coefficient of thermal conductivity" in after-mentioned "evaluations".

The thermally-conductive pressure-sensitive adhesive sheet according to the present invention preferably has a flame retardancy of VTM-0 or V-0 in the flame retardancy test prescribed in UL 94 Standard.

The thermally-conductive pressure-sensitive adhesive sheet according to the present invention preferably has an initial elastic modulus in the range of 0.5 to 2000 MPa. The lower limit of the initial elastic modulus is more preferably 5 MPa and furthermore preferably 50 MPa. The upper limit of the initial elastic modulus is more preferably 1000 MPa and furthermore preferably 500 MPa. The thermally-conductive pressure sensitive adhesive sheet, when having an initial elastic modulus within this range, may have more excellent resistance to wrinkling upon application.

The thermally-conductive pressure-sensitive adhesive sheet according to the present invention preferably has an arithmetic mean surface roughness Ra of the non-adhesive face in the range of 0.001 to 1.0 μm. The lower limit of the arithmetic mean surface roughness Ra is more preferably 0.05 μm and furthermore preferably 0.01 μm. The upper limit of the arithmetic mean surface roughness Ra is more preferably 0.5 μm and furthermore preferably 0.2 μm. The thermally-conductive pressure sensitive adhesive sheet, when having an arithmetic mean surface roughness Ra within this range, may have excellent smoothness.

The thermally-conductive pressure-sensitive adhesive sheet according to the present invention preferably has a holding power (80° C., 100 gf) of equal to or less than 0.5 mm. The holding power is more preferably equal to or less than 0.3 mm and furthermore preferably equal to or less than 0.15 mm.

The thermally-conductive pressure-sensitive adhesive sheet according to the present invention has thermal conductivity, resistance to wrinkling upon application, and smoothness at excellent levels and is advantageously usable typically in uses for securing constitutive elements (constitutive members) for use in electronic appliances (electrical/electronic appliance components). Examples of the electronic appliances include, but are not limited to, mobile devices such as cellular phones (mobile phones), smart-phones, and personal digital assistants; household electrical appliances such as digital cameras, video movies, and personal computers; hard disks; LED illumination; lithium ion batteries; and any other electronic appliances. With decreasing sizes and increasing densities of electrical/electronic appliances in recent years, it becomes difficult to radiate heat generated inside the electrical/electronic appliances upon use to outside of the appliances. The inside of the electrical/electronic appliances, if exposed to such high heat, may ignite. The thermally-conductive pressure-sensitive adhesive sheet according to the present invention has an excellent thermal conductivity and is advantageously used in uses for securing electrical/electronic appliance-constitutive elements inside small-sized and/or thin (e.g., 1 to 20-mm thick) electrical/electronic appliances in which heat is prone to persist internally.

EXAMPLES

The present invention will be illustrated in further detail with reference to several examples below. It should be noted, however, that these examples are by no means intended to limit the scope of the present invention.

Example 1

There was used, as monomer components, a monomer mixture including 82 parts by weight of 2-ethylhexyl acrylate, 12 parts by weight of 2-methoxyethyl acrylate, 5 parts by weight of N-vinyl-2-pyrrolidone (NVP), and 1 part by weight of hydroxyethylacrylamide (HEAA). The monomer mixture was combined with photoinitiators, i.e., 0.05 part by weight of trade name IRGACURE 651 (2,2-dimethoxy-1, 2-diphenylethan-1-one, supplied by BASF Japan Ltd.) and 0.05 part by weight of trade name IRGACURE 184 (1-hydroxycyclohexylphenyl ketone, supplied by BASF Japan Ltd.). The resulting mixture was irradiated with an ultraviolet ray to a viscosity of about 20 Pa·s and yielded a mixture in which part of the monomer components had been polymerized (partially polymerized product of the monomer mixture; syrup). The viscosity was measured using a BH viscometer with a No. 5 rotor, at 10 rpm and at a measurement temperature of 30° C.

Hundred (100) parts by weight of the syrup was combined with 0.05 part by weight of a multifunctional monomer, dipentaerythritol hexaacrylate (trade name KAYARAD DPHA-40H, supplied by Nippon Kayaku Co., Ltd.) and 1 part by weight of a dispersing agent, trade name PLYSURF A212E (supplied by Dai-ichi Kogyo Seiyaku Co., Ltd.). The resulting mixture was further combined with, as thermally-conductive particles, 100 parts by weight of an aluminum hydroxide powder, trade name HIGILITE H-31 (having a crushed shape and having an average particle size of 18 μm, supplied by Showa Denko K.K.) and 100 parts by weight of an aluminum hydroxide powder, trade name HIGILITE H-42 (having a crushed shape and having an average particle size of 1 μm, supplied by Showa Denko K.K.) and yielded a composition.

There was used a poly(ethylene terephthalate) release liner (trade name DIAFOIL MRF38, supplied by Mitsubishi Chemical Polyester Film Co., Ltd.), one side of which had been subjected to a release treatment to form a release surface. The composition was applied to the release surface of the release liner to form a composition layer. On the composition layer, another release liner having the same configuration as above was stacked so that the release surface faced the composition layer and yielded a laminate.

Next, an ultraviolet ray was applied from both sides of the laminate at an illuminance of about 5 mW/cm$^2$ for 3 minutes to cure the composition layer to thereby form a 175-μm thick pressure-sensitive adhesive layer. This gave a laminate having the configuration including the release liner, the pressure-sensitive adhesive layer, and the release liner disposed in this order. An acrylic polymer contained in the pressure-sensitive adhesive layer had a glass transition temperature of −62.8° C. The weight of the acrylic polymer contained in the pressure-sensitive adhesive layer corresponds to the total weight of the monomers to constitute the syrup, and the multifunctional monomer.

Next, the release liner on one side of the pressure-sensitive adhesive layer was removed to expose a surface. The exposed surface of the pressure-sensitive adhesive layer was applied to a poly(ethylene terephthalate) film (substrate) (trade name LUMIRROR S10#12, supplied by Toray Industries Inc., having a thickness of 12 μm) and yielded a single-sided pressure-sensitive adhesive sheet having a configuration including the release liner, the pressure-sensitive adhesive layer, and the substrate disposed in this order. The single-sided pressure-sensitive adhesive sheet had a total thickness (thickness excluding the release liner) of 187 μm. The pressure-sensitive adhesive layer contained the thermally-conductive particles in a content (particle volume percentage) of 42.9 percent by volume.

Example 2

A single-sided pressure-sensitive adhesive sheet having a configuration including a release liner, a pressure-sensitive adhesive layer, and a substrate disposed in this order was prepared by a procedure similar to Example 1, except for using, as the substrate, a poly(ethylene terephthalate) film (trade name LUMIRROR S10#25, supplied by Toray Industries Inc., having a thickness of 25 μm). The single-sided pressure-sensitive adhesive sheet had a total thickness (thickness excluding the release liner) of 200 μm. The pressure-sensitive adhesive layer contained the thermally-conductive particles in a content (particle volume percentage) of 42.9 percent by volume.

Example 3

A single-sided pressure-sensitive adhesive sheet having a configuration including a release liner, a pressure-sensitive adhesive layer, and a substrate disposed in this order was prepared by a procedure similar to Example 1, except for forming the pressure-sensitive adhesive layer to have a thickness of 150 μm and for using, as the substrate, a poly(ethylene terephthalate) film (trade name LUMIRROR S10#38, supplied by Toray Industries Inc., having a thickness of 38 μm). The single-sided pressure-sensitive adhesive sheet had a total thickness (thickness excluding the release liner) of 188 μm. The pressure-sensitive adhesive layer contained the thermally-conductive particles in a content (particle volume percentage) of 42.9 percent by volume.

Example 4

A single-sided pressure-sensitive adhesive sheet having a configuration including a release liner, a pressure-sensitive adhesive layer, and a substrate disposed in this order was prepared by a procedure similar to Example 1, except for forming the pressure-sensitive adhesive layer to have a thickness of 150 μm and for using, as the substrate, a poly(ethylene terephthalate) film (trade name LUMIRROR S10#50, supplied by Toray Industries Inc., having a thickness of 50 μm). The single-sided pressure-sensitive adhesive sheet had a total thickness (thickness excluding the release liner) of 200 μm. The pressure-sensitive adhesive layer contained the thermally-conductive particles in a content (particle volume percentage) of 42.9 percent by volume.

Example 5

An aluminum foil (7 μm thick) was placed between two plies of a poly(ethylene terephthalate) film (trade name DIAFOIL M110-9, supplied by Mitsubishi Chemical Corporation, having a thickness of 9 μm), bonded to the films using an adhesive, and yielded a substrate having a three-layer structure including the poly(ethylene terephthalate) film, the aluminum foil, and the poly(ethylene terephthalate) film disposed in this order. The substrate had a thickness of 30 μm.

A single-sided pressure-sensitive adhesive sheet having a configuration including a release liner, a pressure-sensitive adhesive layer, and a substrate disposed in this order was prepared by a procedure similar to Example 1, except for forming the pressure-sensitive adhesive layer to have a thickness of 175 μm and for using, as the substrate, the three-layer structure substrate. The single-sided pressure-sensitive adhesive sheet had a total thickness (thickness excluding the release liner) of 205 μm. The pressure-sensitive adhesive layer contained the thermally-conductive particles in a content (particle volume percentage) of 42.9 percent by volume.

Example 6

An aluminum foil (7 μm thick) was placed between one poly(ethylene terephthalate) film (trade name LUMIRROR S10#25, supplied by Toray Industries Inc., having a thickness of 25 μm) and another poly(ethylene terephthalate) film (trade name DIAFOIL M110-9, supplied by Mitsubishi Chemical Corporation, having a thickness of 9 μm), bonded to the films using an adhesive, and yielded a substrate having a three-layer structure including the poly(ethylene terephthalate) film, the aluminum foil, and the poly(ethylene terephthalate) film disposed in this order. The substrate had a thickness of 47 μm.

A single-sided pressure-sensitive adhesive sheet having a configuration including a release liner, a pressure-sensitive adhesive layer, and a substrate disposed in this order was prepared by a procedure similar to Example 1, except for forming the pressure-sensitive adhesive layer to have a thickness of 150 μm and for using, as the substrate, the three-layer structure substrate. The pressure-sensitive adhesive layer was disposed, of the substrate, on the poly(ethylene terephthalate) film having a thickness of 9 μm. The single-sided pressure-sensitive adhesive sheet had a total thickness (thickness excluding the release liner) of 197 μm. The pressure-sensitive adhesive layer contained the thermally-conductive particles in a content (particle volume percentage) of 42.9 percent by volume.

Example 7

An aluminum foil (7 μm thick) was placed between one poly(ethylene terephthalate) film (trade name LUMIRROR S10#38, supplied by Toray Industries Inc., having a thickness of 38 μm) and another poly(ethylene terephthalate) film (trade name DIAFOIL M110-9, supplied by Mitsubishi Chemical Corporation, having a thickness of 9 μm), bonded to the films using an adhesive, and yielded a substrate having a three-layer structure including the poly(ethylene terephthalate) film, the aluminum foil, and the poly(ethylene terephthalate) film disposed in this order. The substrate had a thickness of 60 μm.

A single-sided pressure-sensitive adhesive sheet having a configuration including a release liner, a pressure-sensitive adhesive layer, and a substrate disposed in this order was prepared by a procedure similar to Example 1, except for forming the pressure-sensitive adhesive layer to have a thickness of 125 μm and for using, as the substrate, the three-layer structure substrate. The pressure-sensitive adhesive layer was disposed, of the substrate, on the poly(ethylene terephthalate) film having a thickness of 9 μm. The single-sided pressure-sensitive adhesive sheet had a total thickness (thickness excluding the release liner) of 185 μm. The pressure-sensitive adhesive layer contained the thermally-conductive particles in a content (particle volume percentage) of 42.9 percent by volume.

Example 8

A single-sided pressure-sensitive adhesive sheet having a configuration including a release liner, a pressure-sensitive adhesive layer, and a substrate disposed in this order was prepared by a procedure similar to Example 1, except for using, as the substrate, a poly(ethylene terephthalate) film (trade name LUMIRROR 2DC61, supplied by Toray Industries Inc., having a thickness of 2 μm). The single-sided pressure-sensitive adhesive sheet had a total thickness (thickness excluding the release liner) of 177 μm. The pressure-sensitive adhesive layer contained the thermally-conductive particles in a content (particle volume percentage) of 42.9 percent by volume.

Example 9

A substrate-supported single-sided pressure-sensitive adhesive sheet having a configuration including a release liner, a pressure-sensitive adhesive layer, and a substrate disposed in this order was prepared by a procedure similar to Example 1, except for forming the pressure-sensitive adhesive layer to have a thickness of 38 μm and for using, as the substrate, an aluminum foil (trade name BESPA, supplied by Sumikei Aluminum Foil Co., Ltd., having a thickness of 12 μm). In addition, a black, single-sided tape (thermally radiating layer) (trade name UTS-10BAF, supplied by Nitto Denko Corporation, having a thickness of 10 μm) was applied onto the aluminum foil of the substrate-supported single-sided pressure-sensitive adhesive sheet and yielded a single-sided pressure-sensitive adhesive sheet having a configuration including the release liner, the pressure-sensitive adhesive layer, the substrate layer, and the thermally radiating layer disposed in this order. The single-sided pressure-sensitive adhesive sheet had a total thickness (thickness excluding the release liner) of 60 μm. The pressure-sensitive adhesive layer contained the thermally-conductive particles in a content (particle volume percentage) of 42.9 percent by volume.

Example 10

A single-sided pressure-sensitive adhesive sheet having a configuration including a release liner, a pressure-sensitive adhesive layer, a substrate layer, and a thermally radiating layer was prepared by a procedure similar to Example 9, except for using, as the thermally radiating layer, a black, single-sided tape (trade name UTS-20BAF, supplied by Nitto Denko Corporation, having a thickness of 20 μm). The single-sided pressure-sensitive adhesive sheet had a total thickness (thickness excluding the release liner) of 70 μm. The pressure-sensitive adhesive layer contained the thermally-conductive particles in a content (particle volume percentage) of 42.9 percent by volume.

Comparative Example 1

A laminate having a configuration including a release liner, a pressure-sensitive adhesive layer (175 μm thick), and a release liner was prepared by a procedure similar to Example 1. This was regarded as a double-sided (transfer) pressure-sensitive adhesive sheet. The double-sided pressure-sensitive adhesive sheet had a total thickness (thickness excluding the release liners) of 175 μm. The pressure-sensitive adhesive layer contained the thermally-conductive particles in a content (particle volume percentage) of 42.9 percent by volume.

Evaluations

The pressure-sensitive adhesive sheets obtained in the examples and comparative example were subjected to measurements and evaluations as follows. The results are indicated in Table 1.

(1) Thermal Resistance and Coefficient of Thermal Conductivity

The pressure-sensitive adhesive sheets obtained in the examples and comparative example were examined to measure a coefficient of thermal conductivity in the thickness direction using a thermal characterization system illustrated in FIGS. 3(a) and 3(b). FIG. 3(a) and FIG. 3(b) are respectively a schematic front view and a schematic side view illustrating the thermal characterization system. The release liner(s) had been removed before the measurements.

Specifically, a pressure-sensitive adhesive sheet 1 (20 mm wide by 20 mm long) was placed between a pair of blocks (also referred to as "rods") L, each of which were made of aluminum (A5052, having a coefficient of thermal conductivity of 140 W/m·K) and was formed to be a cube having a length of each side of 20 mm. Thus, the pair of blocks L was bonded to each other via the pressure-sensitive adhesive sheet 1.

Next, the resulting article was placed between a heating element (heater block) H and a heat-dissipating element C so that the pair of blocks L faced upward and downward. The heat-dissipating element C is a cooling base board that is configured so as to allow cooling water to circulate inside of the board. Specifically, the heating element H was disposed over the upper block L, and the heat-dissipating element C was disposed below the lower block L.

Then, the pair of blocks L bonded to each other via the pressure-sensitive adhesive sheet 1 was positioned between a pair of pressure-adjusting screws T that penetrated the heating element H and the heat-dissipating element C. Load cells R were disposed between the pressure-adjusting screws T and the heating element H and were configured to measure a pressure upon tightening of the pressure-adjusting screws T. The determined pressure was defined as a pressure applied to the pressure-sensitive adhesive sheet 1.

Specifically, in this test, the pressure-adjusting screws T were tightened so that the pressure applied to the pressure-sensitive adhesive sheet 1 be 25 N/cm$^2$ (250 kPa).

In addition, three probes P (1 mm in diameter) of a contact displacement meter were disposed so as to penetrate the lower block L and the pressure-sensitive adhesive sheet 1 from the heat-dissipating element C side. In this state, the top ends (upper ends) of the probes P were in contact with the bottom of the upper block L. The system was configured so as to be capable of measuring the spacing between the upper and lower blocks L (measuring the thickness of the pressure-sensitive adhesive sheet 1).

The heating element H and the upper and lower blocks L were equipped with temperature sensors D. Specifically, one of the temperature sensors D was mounted into the heating element H at one point; and the other temperature sensors D were mounted into each block L each at five points at intervals of 5 mm in the vertical direction (up-and-down direction).

In the measurement, initially, the pressure-adjusting screws T were tightened to apply a pressure to the pressure-sensitive adhesive sheet 1, and the temperature of the heating element H was set to be 80° C. while cooling water at 20° C. was circulated in the heat-dissipating element C.

After the temperatures of the heating element H and the upper and lower blocks L became stable, the temperatures of the upper and lower blocks L were measured with the temperature sensors D. A heat flux passing through the pressure-sensitive adhesive sheet 1 was calculated from the coefficients of thermal conductivity (W/m·K) and temperature gradients of the upper and lower blocks L; and the temperatures of the interfaces of the upper and lower blocks L with the pressure-sensitive adhesive sheet 1 were calculated. Using these values, the coefficient of thermal conductivity (W/m·K) and the thermal resistance (K·cm$^2$/W) at the pressure were calculated according to the heat conduction equations (according to the Fourier's Law) as follows:

$$Q=-\lambda \text{grad} T$$

$$R=L/\lambda$$

where Q represents the heat flux per unit area;
gradT represents the temperature gradient;
L represents the sheet thickness;
λ represents the coefficient of thermal conductivity; and
R represents the thermal resistance.

(2) Resistance to Wrinkling Upon Application

The pressure-sensitive adhesive sheets obtained in the examples and comparative example were each cut into pieces of a size of 20 mm by 100 mm and were used as samples. Each sample was applied (bonded) to an adherend SUS304BA panel by one reciprocating movement of a 2-kg roller on the substrate side of the sample. The number of wrinkles occurring in the substrate surface in a direction perpendicular to the application direction (bonding direction) was evaluated according to criteria as follows:

Good: The number of wrinkles each extending 10 mm or longer was less than 20;

Fair: The number of wrinkles each extending 10 mm or longer was from 20 to less than 50; and Poor: The number of wrinkles each extending 10 mm or longer was equal to or more than 50.

(3) Initial Elastic Modulus

The pressure-sensitive adhesive sheets obtained in the examples and comparative example were cut so as to give evaluation samples each having an initial length of 10 mm and a cross-sectional area of 1.2 to 5.0 mm$^2$. The samples were each subjected to a tensile test at a measurement temperature of 23° C., a chuck-to-chuck distance of 10 mm, and a tensile speed of 300 mm/min, in which the change (mm) in elongation of the sample was measured to plot an S-S curve. A tangent line was drawn at an initial rise in the S-S curve. A tensile strength at which the tangent line corresponds to 100% elongation was divided by the cross-sectional area of the evaluation sample, and the resulting value was defined as the tensile modulus of elasticity (MPa).

(4) Smoothness (Arithmetic Mean Surface Roughness Ra)

The pressure-sensitive adhesive sheets obtained in the examples and comparative example were each applied to slide glass. The surface roughness of the substrate surface (the adhesive face in Comparative Example 1) of the resulting articles was measured using the Optical Profiler NT9100 (supplied by Veeco Instruments, Inc.) under conditions of a measurement type of VSI (infinite scan), an objective of 2.5×, a field of view (FOV) of 1.0×, and a modulation threshold of 0.1% for n=3. After the measurement, data were analyzed under the conditions of terms removal of tilt only (plane fit) and window filtering of none to determine the arithmetic mean surface roughness Ra (μm).

(5) Holding Power

The pressure-sensitive adhesive sheets obtained in the examples and comparative example were used as evaluation samples. Evaluations were performed in conformity to the holding power evaluation prescribed in JIS 21528. Specifically, one side (adhesive face) of each pressure-sensitive adhesive sheet was lined with LUMIRROR S-10#25 (supplied by Toray Industries Inc.) and yielded a sample with a backing (lining). The sample with a backing was applied to and bonded to a test panel in an area of 10 mm by 20 mm by one reciprocating movement of a 2-kg roller. The resulting sample was aged at room temperature of 23° C. for 30 minutes, to which a 100-g load was applied at an ambient temperature of 80° C. for one hour, the displacement of the sample with respect to the initial position in bonding was determined, and this was defined as the holding power (mm).

(6) Adhesive Residue on Adherend B

The pressure-sensitive adhesive sheets obtained in the examples and comparative example were each cut out to give an evaluation sample having a size of 20 mm by 100 mm, from which the release liner on an adhesive face was removed to expose the adhesive face. The exposed adhesive face of the sample was applied to and bonded to a SUS304BA panel (adherend A) by one reciprocating movement of a 2-kg roller at a speed of 5 mm/sec. Next, the substrate surface (in Comparative Example 1, this corresponded to an exposed adhesive face after the removal of the other release liner) was placed on another SUS304BA panel (adherend B) and forcedly pressed onto the panel by one reciprocating movement of a 2-kg roller at a speed of 5 mm/sec. This was heated at 80° C. for 2 hours and left stand to cool at room temperature for one hour. The sample was then peeled off at the interface with the adherend B at a peel angle of 180 degrees and at a speed of 10 mm/sec. Whether the adhesive remained as adhesive residue on the adherend B was visually observed, and the adhesive residue was evaluated according to criteria as follows:

Good: No adhesive residue; and
Poor: Adhesive residue.

TABLE 1

|  | Examples | | | | | | | | | | Comparative Example |
|---|---|---|---|---|---|---|---|---|---|---|---|
|  | 1 | 2 | 3 | 4 | 5 | 6 | 7 | 8 | 9 | 10 | 1 |
| Pressure-sensitive adhesive layer thickness (μm) | 175 | 175 | 150 | 150 | 175 | 150 | 125 | 175 | 38 | 38 | 175 |
| Non-adhesive layer thickness (μm) | 12 | 25 | 38 | 50 | 30 | 47 | 60 | 2 | 22 | 32 | — |
| Total thickness (μm) | 187 | 200 | 188 | 200 | 205 | 197 | 185 | 177 | 60 | 70 | 175 |
| Ratio of non-adhesive layer thickness to pressure-sensitive adhesive layer thickness | 0.069 | 0.14 | 0.25 | 0.33 | 0.17 | 0.31 | 0.48 | 0.011 | 0.58 | 0.84 | — |
| Ratio of non-adhesive layer thickness to total thickness | 0.064 | 0.13 | 0.20 | 0.25 | 0.15 | 0.24 | 0.32 | 0.011 | 0.37 | 0.46 | — |
| Thermal resistance (K·cm$^2$/W) | 3.42 | 4.26 | 5.12 | 5.88 | 4.11 | 5.14 | 5.89 | 1.8 | 1.12 | 1.42 | 1.7 |
| Coefficient of thermal conductivity (W/m·K) | 0.55 | 0.47 | 0.37 | 0.34 | 0.50 | 0.38 | 0.31 | 0.61 | 0.51 | 0.43 | 0.61 |
| Resistance to wrinkling upon application | Good | Good | Good | Good | Good | Good | Good | Fair | Good | Good | Poor |
| Initial elastic modulus (MPa) | 62.5 | 184 | 398 | 640 | 290 | 600 | 700 | 14 | 72 | 75 | 6 |
| Arithmetic mean surface roughness Ra (μm) | 0.18 | 0.09 | 0.08 | 0.08 | 0.08 | 0.08 | 0.08 | 0.8 | 0.12 | 0.11 | 1.1 |
| Holding power (mm) | 0.1 | 0.1 | 0.1 | 0.1 | 0.1 | 0.1 | 0.1 | 0.1 | 0.1 | 0.1 | 0.1 |
| Adhesive residue on adherend | Good | Good | Good | Good | Good | Good | Good | Good | Good | Good | Poor |

INDUSTRIAL APPLICABILITY

The thermally-conductive pressure-sensitive adhesive sheet according to the present invention can thermally couple members at both sides of the sheet to each other and exhibits excellent thermal conductivity. The thermally-conductive pressure sensitive adhesive sheet can adhesively secure the adherend, such as a member or any other component, at an adhesive face, but neither adheres to, nor secure a member or any other component at a non-adhesive face. This configuration allows the member or any other component at the non-adhesive face to be moved and/or detached as need arises. The thermally-conductive pressure sensitive adhesive sheet having the configuration is useful typically as thermally-conductive pressure-sensitive adhesive sheets for use in thin electrical/electronic appliances.

REFERENCE SIGNS LIST 10 pressure-sensitive adhesive layer
20 non-adhesive layer (substrate)
21 plastic film
22 metallic foil
23 plastic film
1 pressure-sensitive adhesive sheet (thermally-conductive pressure-sensitive adhesive sheet)
2 thermometer
3 contact displacement meter
C heat-dissipating element
D temperature sensor
H heating element (heat block)
L block (rod)
P probe
R load cell
T pressure-adjusting screw

The invention claimed is:

1. A thermally-conductive pressure-sensitive adhesive sheet that is thermally coupled to members at both sides of the sheet, but is not physically bonded or joined to one of the members comprising
   a pressure-sensitive adhesive layer including thermally-conductive particles, and
   a non-adhesive layer disposed on or over only one side of the pressure-sensitive adhesive layer,
   the thermally-conductive pressure-sensitive adhesive sheet having:
      one side being an adhesive face; and
      the other side being a non-adhesive face,
   wherein the non-adhesive face has an arithmetic mean surface roughness Ra of 0.001 to 0.5 μm,
   wherein a ratio of a thickness of the non-adhesive layer to a thickness of the pressure-sensitive adhesive layer is 0.04 to 0.6,
   wherein the thermally-conductive particles comprise a first group of particles having a D50 average particle size of 10 to 18 μm and a second group of particles having a D50 average particle size of 0.1 to 3 μm, and
   wherein the thermally-conductive pressure-sensitive adhesive sheet has a thermal resistance of equal to or less than 6 K·cm$^2$/W.

2. The thermally-conductive pressure-sensitive adhesive sheet according to claim 1, wherein the thermally-conductive pressure-sensitive adhesive sheet has an initial elastic modulus of 0.5 to 2000 MPa.

3. The thermally-conductive pressure-sensitive adhesive sheet according to claim 1, wherein the non-adhesive face is black.

4. The thermally-conductive pressure-sensitive adhesive sheet according to claim 1, for use in a thin electrical/electronic appliance.

5. The thermally-conductive pressure-sensitive adhesive sheet according to claim 1, wherein the thermally-conductive particles comprise metal hydroxides, the pressure-sensitive adhesive layer further comprises an acrylic polymer as a base polymer, and
   a proportion of a carboxy-containing monomer is equal to or less than 0.1 percent by weight based on the total weight (100 percent by weight) of all monomers constituting the acrylic polymer.

6. The thermally-conductive pressure-sensitive adhesive sheet according to claim 1, wherein the arithmetic mean surface roughness Ra of the non-adhesive face is 0.01 to 0.2 μm.

7. The thermally-conductive pressure-sensitive adhesive sheet according to claim 1, wherein a thickness of the pressure-sensitive adhesive layer is 100 to 200 μm.

8. The thermally-conductive pressure-sensitive adhesive sheet according to claim 1, wherein the thermally-conductive particles comprise metal hydroxides,
the pressure-sensitive adhesive layer further comprises an acrylic polymer as a base polymer,
a proportion of a carboxy-containing monomer is equal to or less than 0.1 percent by weight based on the total weight (100 percent by weight) of all monomers constituting the acrylic polymer, and
the arithmetic mean surface roughness Ra of the non-adhesive face is 0.01 to 0.2 μm.

9. The thermally-conductive pressure-sensitive adhesive sheet according to claim 1, wherein the thermal resistance of the thermally-conductive pressure-sensitive adhesive sheet is 3 to 6 K·cm$^2$/W.

10. The thermally-conductive pressure-sensitive adhesive sheet according to claim 1, wherein the arithmetic mean surface roughness Ra of the non-adhesive face is 0.08 to 0.18 μm,
a thickness of the pressure-sensitive adhesive layer is 125 to 175 μm,
a total thickness of the thermally-conductive pressure-sensitive adhesive sheet is 185 to 205 μm,
the ratio of the thickness of the non-adhesive layer to the thickness of the pressure-sensitive adhesive layer is 0.06 to 0.6,
the thermally-conductive particles are at least one type of particles selected from the group consisting of aluminum hydroxide, alumina, and magnesium oxide,
the pressure-sensitive adhesive layer comprises an acrylic polymer as a base polymer,
the acrylic polymer comprises a polymer derived from constitutional monomers including a (meth)acrylic alkyl ester having an alkyl moiety containing 4 to 9 carbon atoms,
a proportion of a carboxy-containing monomer is equal to or less than 0.1 percent by weight based on the total weight (100 percent by weight) of all monomers constituting the acrylic polymer,
the thermal resistance of the pressure-sensitive adhesive sheet is 3 to 6 K·cm$^2$/W, and
the thermally-conductive pressure-sensitive adhesive sheet has an initial elastic modulus of 50 to 1000 MPa.

11. The thermally-conductive pressure-sensitive adhesive sheet according to claim 1, wherein the pressure-sensitive adhesive layer has a thickness of 25 to 200 μm.

12. The thermally-conductive pressure-sensitive adhesive sheet according to claim 1, wherein the thermally-conductive pressure-sensitive adhesive sheet has a total thickness of 140 to 240 μm.

13. The thermally-conductive pressure-sensitive adhesive sheet according to claim 1, wherein
the weight ratio of the first group of particles to the second group of particles is from 3:7 to 7:3.

14. The thermally-conductive pressure-sensitive adhesive sheet according to claim 1, wherein the pressure-sensitive adhesive layer contains the thermally-conductive particles in a total content from 25 percent by volume to 75 percent by volume based on the 100 percent by volume of the pressure-sensitive adhesive layer.

15. The thermally-conductive pressure-sensitive adhesive sheet according to claim 1, wherein the thermally-conductive particles have a D50 average particle size of equal to or less than 10 μm and the pressure-sensitive adhesive layer contains the thermally-conductive particles having a D50 average particle size of equal to or less than 10 μm in a proportion of 50 to 300 parts by weight per 100 parts by weight of the base polymer in the pressure-sensitive adhesive layer.

16. The thermally-conductive pressure-sensitive adhesive sheet according to claim 1, wherein the thermally-conductive pressure-sensitive adhesive sheet has an initial elastic modulus of 50 to 2000 MPa.

17. The thermally-conductive pressure-sensitive adhesive sheet according to claim 1, wherein the non-adhesive layer comprises a laminate having a layer configuration of plastic film/metallic foil, or a laminate having a layer configuration of plastic film/metallic foil/plastic film.

\* \* \* \* \*